US009311599B1

(12) United States Patent
Attenberg et al.

(10) Patent No.: US 9,311,599 B1
(45) Date of Patent: Apr. 12, 2016

(54) METHODS, SYSTEMS, AND MEDIA FOR IDENTIFYING ERRORS IN PREDICTIVE MODELS USING ANNOTATORS

(75) Inventors: Joshua M. Attenberg, Roxbury, CT (US); Panagiotis G. Ipeirotis, New York, NY (US); Foster J. Provost, New York, NY (US)

(73) Assignees: Integral Ad Science, Inc., New York, NY (US); New York University, New York, NY (US)

( * ) Notice: Subject to any disclaimer, the term of this patent is extended or adjusted under 35 U.S.C. 154(b) by 110 days.

(21) Appl. No.: 13/544,779

(22) Filed: Jul. 9, 2012

Related U.S. Application Data

(60) Provisional application No. 61/506,005, filed on Jul. 8, 2011.

(51) Int. Cl.
  *G06N 5/02* (2006.01)
  *G06F 15/18* (2006.01)

(52) U.S. Cl.
  CPC . *G06N 5/02* (2013.01); *G06F 15/18* (2013.01)

(58) Field of Classification Search
  None
  See application file for complete search history.

(56) References Cited

U.S. PATENT DOCUMENTS

| 2008/0270336 | A1* | 10/2008 | Talbot et al. ............ 706/46 |
| 2011/0047006 | A1 | 2/2011 | Attenberg et al. |
| 2011/0047035 | A1 | 2/2011 | Gidwani et al. |
| 2011/0173037 | A1 | 7/2011 | Attenberg et al. |
| 2012/0010927 | A1 | 1/2012 | Attenberg et al. |
| 2012/0158620 | A1* | 6/2012 | Paquet et al. ............ 706/12 |

OTHER PUBLICATIONS

Manevitz, L. et al. "One-class SVMs for document classification." the Journal of machine Learning research 2 (2002): pp. 139-154.*
Snow, R. et al. "Cheap and fast—but is it good?: evaluating non-expert annotations for natural language tasks." Proceedings of the conference on empirical methods in natural language processing. Association for Computational Linguistics, 2008.*
Laws, F. et al. "Active learning with amazon mechanical turk." Proceedings of the conference on empirical methods in natural language processing. Association for Computational Linguistics, 2011.*
Manevitz, L. et al. "One-class SVMs for document classification." the Journal of machine Learning research 2 (2002): 139-154.*

(Continued)

*Primary Examiner* — Kakali Chaki
*Assistant Examiner* — Eric Nilsson
(74) *Attorney, Agent, or Firm* — Byrne Poh LLP

(57) ABSTRACT

Methods, systems, and media for identifying errors in predictive models using annotators are provided. In some embodiments, a method for evaluating predictive models in classification systems is provided, the method comprising: causing an input region to be presented to a user, where the input region receives an instance from the user that corresponds to a predictive model; retrieving a classification conducted by the predictive model for the received instance and a confidence value associated with the classification; determining whether the received instance has been incorrectly classified by the predictive model; determining a reward associated with the incorrect classification made by the predictive model in response to determining that the received instance has been incorrectly classified by the predictive model, where the reward is based on the confidence value associated with the classification of the received instance; and providing the reward to the user.

20 Claims, 18 Drawing Sheets

(56) References Cited

OTHER PUBLICATIONS

Lewis, D. et al. "A sequential algorithm for training text classifiers." Proceedings of the 17th annual international ACM SIGIR conference on Research and development in information retrieval. Springer-Verlag New York, Inc., 1994.*

Attenberg, J. et al. "Beat the Machine: Challenging Workers to Find the Unknown Unknowns." Human Computation 11 (2011): pp. 2-7.*

Raykar, V., et al. "Supervised learning from multiple experts: whom to trust when everyone lies a bit." Proceedings of the 26th Annual international conference on machine learning. ACM, 2009.*

* cited by examiner

Hits list

Home » Categories list » Category: Identify pages that contain hate speech on the web » Hits list

| # | Title | Group Id | Created | Actions |
|---|---|---|---|---|
| 1 | Identify pages that contain hate speech on the web | 2FQTNHNZSM5Q4W86LDO5GVF7RO2C1 | 6 months ago | show assignments<br>show results |
| 2 | Identify pages that contain hate speech on the web | 2JIXYRQQWXLGR3AN5VCCC9WNU35G8XK | 6 months ago | show assignments<br>show results |
| 3 | Identify pages that contain hate speech on the web | 24LIXYB4FF8SYQCH&GFN7T3H9OAU3C | 6 months ago | show assignments<br>show results |
| 4 | Identify pages that contain hate speech on the web | 235U&P8Y38T23QY72PLYLM0JKXXGC | 6 months ago | show assignments<br>show results |

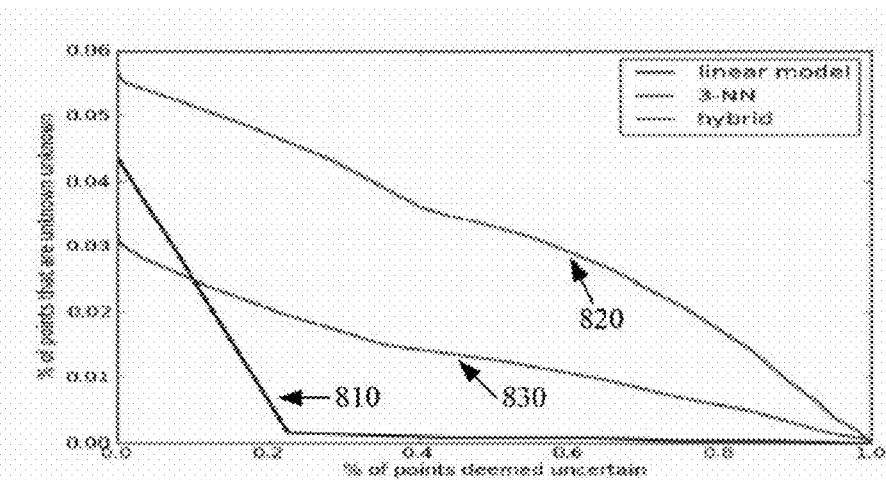
(a) 150 k-NN Training Examples
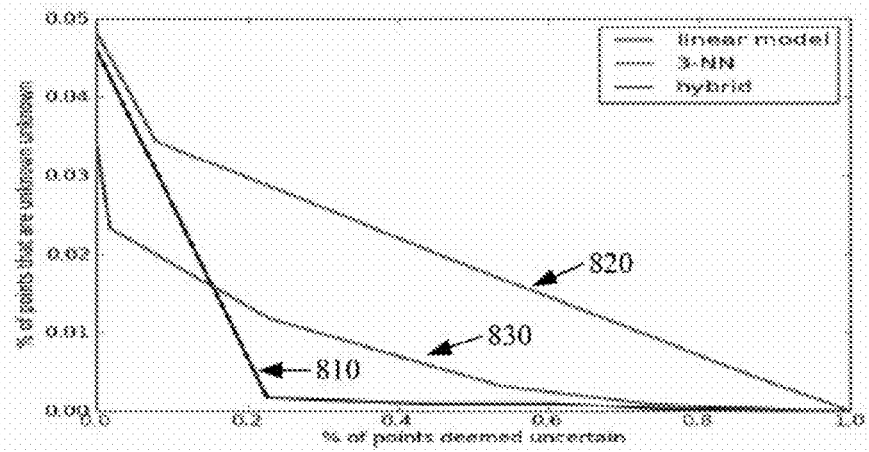
(b) 1,500 k-NN Training Examples
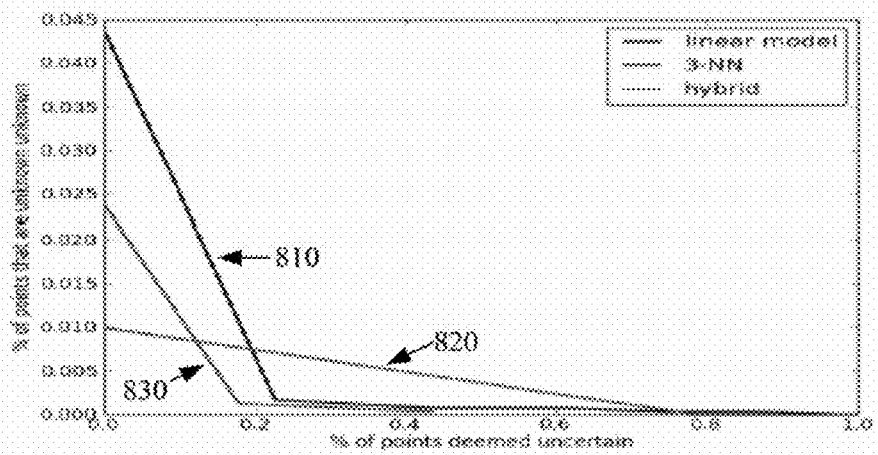
(c) 15,000 k-NN Training Examples
FIG. 8

FIG. 9

Results list

Home » Categories list » Category: Identify pages that contain hate speech on the web » Bonus Urls

| # | Url | Admin status | Urlmoderator status | Bonus | Worker |
|---|---|---|---|---|---|
| 1 | http://page-of-treason.blogspot.com/ | HAT-R (451) | HAT-G | 549 | AWITU1Z8OBI3 |
| 2 | http://ragedeershater.com/ | HAT-G (1000) | HAT-PG | 325 | A2TGHJNIJMETDE |
| 3 | http://dennisobamasupport.blogspot.com/ | HAT-G (979) | HAT-R | 634 | AWITU1Z8OBI3 |
| 4 | http://jewschrines.com/job/new/2019/should-the-government-keep-take-on-hate-speech.ars | HAT-PG (672) | HAT-G | 338 | A3RLDEBYI62BY |
| 5 | http://anyonebabiesonencal.org/ | HAT-G (920) | HAT-X | 920 | A2EZDM8HXCB8L9 |
| 6 | http://patentstrings1000.typepad.com/ | HAT-PG (679) | HAT-G | 321 | A3X9GF0MM3M8B |
| 7 | http://settertatthesystem.com/ | HAT-G (1000) | HAT-PG | 325 | A3KDNJGMRMRDC |
| 8 | http://skillswittekid82.wordpress.com/ | HAT-PG (622) | HAT-X | 622 | AWITU1Z8OBI3 |
| 9 | http://bloggs.tribune.com.pk/story/4328/hating-terry-jones-is-bad-for-muslims/ | HAT-G (1000) | HAT-X | 1000 | ATONG8PSO4KX3 |

Result

Home » Categories list » Category Identify pages that contain hate speech on the web » Hit » Result

| | |
|---|---|
| Url: | http://blogs.tribune.com.pk/story/5220/hating-terry-jones-is-bad-for-muslims/ |
| Category: | Identify pages that contain hate speech on the web |
| Worker: | ATONO8P5O4KX3 |
| Adsafe score: | G (1000) |
| Url annotator score: | X |
| Bonus: | 1000 |
| Created: | April 7, 2011, 4:40 a.m. |

Results list

Home » Categories list » Category Identify pages that contain hate speech on the web » Workers list » Worker A10H4YKEBSGAXE » Result list

| # | Url | Adults status | Urlinspector status | Bonus | Worker |
|---|---|---|---|---|---|
| 1 | http://www.4chan.org/b/ | HAT-PG (693) | HAT-G | 307 | A10H4YKEBSGAXE |
| 2 | http://www.gochatefags.com | HAT-Unknown | *This result cannot be checked* | -- | A10H4YKEBSGAXE |
| 3 | http://www.hatefuck.com | HAT-G (1000) | HAT-G | -- | A10H4YKEBSGAXE |
| 4 | http://www.kkk.com | HAT-R (261) | HAT-X | 261 | A10H4YKEBSGAXE |
| 5 | http://www.racistjokes.com/index.php | HAT-X (210) | HAT-R | 165 | A10H4YKEBSGAXE |

1300

Results list

Home » Categories list » Category Identify pages that contain hate speech on the web » Workers list » Worker A10H4YKEBSGAXE » Bonus Urls

| # | Url | Adults status | Urlinspector status | Bonus | Worker |
|---|---|---|---|---|---|
| 1 | http://www.4chan.org/b/ | HAT-PG (693) | HAT-G | 307 | A10H4YKEBSGAXE |
| 2 | http://www.kkk.com | HAT-R (261) | HAT-X | 261 | A10H4YKEBSGAXE |
| 3 | http://www.racistjokes.com/index.php | HAT-X (210) | HAT-R | 165 | A10H4YKEBSGAXE |

Edit mturk account: AdSafe Media

Home » Mturk account: AdSafe Media

| Field | Value | Description |
|---|---|---|
| Name: | AdSafe Media | |
| Api key: | AKIAJDUGL32U52MAM4OA | Url checker API key |
| Secret key: | gswtjQlysPbMw8r9DHrKjcz/BXMBd | Secret string for given API key |
| Local address: | adsafe-beatthemachine.appspot.cor | Application base domain |
| Mode: | ● sandbox ○ production | Run in sandbox (testing) mode or as production instance. |
| Min bonus: | 1 | Minimum amount of money that could be sent to worker |
| Bonus points in dolar: | 5000 | Number of bonus points equal to 1 dollar |
| Account balance: | $10,000.00 | |

METHODS, SYSTEMS, AND MEDIA FOR IDENTIFYING ERRORS IN PREDICTIVE MODELS USING ANNOTATORS

CROSS REFERENCE TO RELATED APPLICATIONS

This application claims the benefit of U.S. Provisional Patent Application No. 61/506,005, filed Jul. 8, 2011, which is hereby incorporated by reference herein in its entirety.

TECHNICAL FIELD

The disclosed subject matter generally relates to identifying errors in predictive models using annotators. More particularly, the disclosed subject matter facilitates the identification of errors in predictive models by incentivizing users to submit instances (e.g., pages, documents, etc.) that would be incorrectly classified by a predictive model.

BACKGROUND

Brands are carefully crafted and incorporate a company's image. Unfortunately, in the current online environment, advertising networks juxtapose advertisements that represent such brands with undesirable content due to the opacity of the ad-placement process and possibly due to a misalignment of incentives in the ad-serving ecosystem. Even isolated, outlier cases can cause significant damage, for example, to the public image of a company that inadvertently supports a website containing such undesirable content through advertising.

Online advertisers typically use tools that provide information about websites or publishers and the viewers of such websites to facilitate more effective planning and management of online advertising by advertisers. Moreover, online advertisers continually desire increased control over the web pages on which their advertisements and brand messages appear. For example, particular online advertisers may want to control the risk that their advertisements and brand messages appear on pages or sites that contain objectionable content (e.g., pornography or adult content, hate speech, bombs, guns, ammunition, alcohol, offensive language, tobacco, spyware, malicious code, illegal drugs, music downloading, particular types of entertainment, illegality, obscenity, etc.). In another example, advertisers for adult-oriented products, such as alcohol and tobacco, may want to avoid pages directed towards children. In yet another example, particular online advertisers may want to increase the probability that their content appears on specific sorts of sites (e.g., websites containing news-related information, websites containing entertainment-related information, etc.). However, many advertising tools merely categorize websites into categories indicating that a web site contains a certain sort of content.

Other approaches use models, such as predictive models or classification models, to determine whether a website contains or has a tendency to contain questionable content. In a particular example, features relating to the use of classification models for calculating content quality ratings for web pages, domains, and sitelets are described in commonly-owned, commonly-assigned U.S. patent application Ser. No. 12/859,763, filed Aug. 19, 2010 and U.S. patent application Ser. No. 13/151,146, filed Jun. 1, 2011, which are hereby incorporated by reference herein in their entireties. Accordingly, rating systems can be used to generate classification models to monitor and detect the presence of questionable content on, for example, web pages.

However, assessing and evaluating the performance of these models is particularly challenging. In one example, the efficacy of these rating systems and, more particularly, its one or more predictive models can depend, however, on the quality of the data used to train them. The size of training data sets can make manual removal or labeling of pages difficult and/or impractical. As a result, models trained on such data may, for example, miss some cases (e.g., not classify objectionable content on pages), misclassify some cases (e.g., deem content as objectionable when the content is benign or deem benign when the content is objectionable), or have other errors. In a more particular example, referring to the rating system mentioned above, the model used by the rating system may misclassify a hate speech page as being suitable for advertising. In another particular example, the model used by the rating system can overlook rare, but nevertheless important, classes or subclasses of cases, such as hatred towards data miners.

There is therefore a need in the art for approaches for identifying errors in predictive models using annotators. Accordingly, it is desirable to provide methods, systems, and media that overcome these and other deficiencies of the prior art.

SUMMARY

In accordance with various embodiments of the disclosed subject matter, mechanisms for identifying errors in predictive models using annotators are provided.

In some embodiments, a method for evaluating predictive models in classification systems is provided, the method comprising: causing, using a hardware processor, an input region to be presented to a user, wherein the input region receives an instance from the user that corresponds to a predictive model; retrieving, using the hardware processor, a classification conducted by the predictive model for the received instance and a confidence value associated with the classification; determining, using the hardware processor, whether the received instance has been incorrectly classified by the predictive model; in response to determining that the received instance has been incorrectly classified by the predictive model, determining, using the hardware processor, a reward associated with the incorrect classification made by the predictive model, wherein the reward is based on the confidence value associated with the classification of the received instance; and providing, using the hardware processor, the reward to the user.

In some embodiments, the instance includes at least one of: a page and a document.

In some embodiments, the input region includes task information relating to the predictive model. In some embodiments, the method further includes: receiving, from an administrator user, a selected predictive model from a plurality of predictive models; and determining the task information associated with the selected predictive model to display in the input region.

In some embodiments, the method further includes: receiving a user selection of the predictive model from a plurality of predictive models; and determining task information associated with the predictive model corresponding to the received user selection to display in the input region.

In some embodiments, the method further includes transmitting the received instance to an administrator user for validation of the incorrect classification in response to determining that the received instance has been incorrectly classified by the predictive model.

In some embodiments, where determining whether the received instance has been incorrectly classified by the predictive model, the method further includes: receiving an indication from the user that the received instance belongs in a minority class; determining whether the received instance is classified by the predictive model as belonging in a majority class; and transmitting the received instance to an administrator user for validation.

In some embodiments, where determining whether the received instance has been incorrectly classified by the predictive model, the method further includes: receiving an indication from the user that the received instance belongs in a majority class; determining whether the instance is classified by the predictive model as belonging in a minority class; and transmitting the instance to an administrator user for validation.

In some embodiments, the method further includes: extracting a category identifier and a user classification from the received instance; comparing the user classification with the classification made by the predictive model; and inhibiting the received instance from being transmitted to an administrator user for validation based at least in part on the comparison and the confidence value. In some embodiments, the received instance is rejected in response to determining that the user classification and the classification made by the predictive model are the same and the confidence value is greater than a threshold value. In some embodiments, the method further includes determining the reward in response to determining that the confidence value is below a threshold value.

In some embodiments, the method further includes determining an error value associated with the classification based at least in part on the confidence value. In some embodiments, the method further includes determining the reward based at least in part on the error value and the confidence value associated with the classification.

In some embodiments, the method further includes determining a frequency value associated with the classification based at least in part on keywords associated with the classification made by the predictive model. In some embodiments, the method further includes: determining the keywords associated with the classification made by the predictive model; transmitting a search query for instances matching the keywords associated with the classification made by the predictive model; and calculating the frequency value based on the number of instances matching the keywords associated with the classification made by the predictive model.

In some embodiments, the method further includes determining the reward based at least in part on the prevalence value and the confidence value associated with the classification. In some embodiments, the method further includes determining the reward based least in part on the confidence value associated with the classification, the error value, and the prevalence value.

In some embodiments, the method further includes retrieving a payment distribution associated with the predictive model that includes a first payment associated with a first confidence value and a second payment associated with a second confidence value, wherein the first confidence value is greater than the second confidence value and wherein the first payment is greater than the second payment based on the confidence value.

In some embodiments, the method further includes receiving a plurality of gaming parameters from an administrator user, wherein the input region that allows the user to submit one or more instances is presented based on the plurality of gaming parameters.

In accordance with some embodiments of the disclosed subject matter, a system for evaluating predictive models in classification systems is provided. The system includes a processor that: causes an input region to be presented to a user, wherein the input region receives an instance from the user that corresponds to a predictive model; retrieves a classification conducted by the predictive model for the received instance and a confidence value associated with the classification; determines whether the received instance has been incorrectly classified by the predictive model; in response to determining that the received instance has been, incorrectly classified by the predictive model, determines a reward associated with the incorrect classification made by the predictive model, wherein the reward is based on the confidence value associated with the classification of the received instance; and provides the reward to the user.

In accordance with some embodiments of the disclosed subject matter, a non-transitory computer-readable medium containing computer-executable instructions that, when executed by a processor, cause the process to perform a method for evaluating predictive models in classification systems, is provided. The method comprising: causing an input region to be presented to a user, wherein the input region receives an instance from the user that corresponds to a predictive model; retrieving a classification conducted by the predictive model for the received instance and a confidence value associated with the classification; determining whether the received instance has been incorrectly classified by the predictive model; in response to determining that the received instance has been incorrectly classified by the predictive model, determining a reward associated with the incorrect classification made by the predictive model, wherein the reward is based on the confidence value associated with the classification of the received instance; and providing the reward to the user.

BRIEF DESCRIPTION OF THE DRAWINGS

Various objects, features, and advantages of the present invention can be more fully appreciated with reference to the following detailed description of the invention when considered in connection with the following drawing, in which like reference numerals identify like elements.

FIG. 2 is an illustrative display screen of a predictive model evaluation application that receives one or more instances in the form of uniform resource locations (URLs) from an annotator user in accordance with some embodiments of the disclosed subject matter.

FIG. 3 is an illustrative display screen of a predictive model evaluation application that can be used to provide categories associated with one or more predictive models in accordance with some embodiments of the disclosed subject matter.

FIG. 4 is an illustrative display screen of a predictive model evaluation application that can be used to create and/or modify a category or task associated with one or more predictive models in accordance with some embodiments of the disclosed subject matter.

FIG. 5 is an illustrative display screen of a predictive model evaluation application that can be used to provide a list of hits in accordance with some embodiments of the disclosed subject matter.

FIG. 8 are illustrative graphs showing the tradeoffs between unknown unknown and points deemed uncertain for various models and for various training example sizes in accordance with some embodiments of the disclosed subject matter.

FIG. 9 is an illustrative display screen of a predictive model evaluation application that can be used to provide a list of results in accordance with some embodiments of the disclosed subject matter.

FIG. 10 is an illustrative display screen of a predictive model evaluation application that can be used to provide a list of submitted instances (e.g., pages) that received a bonus payment in accordance with some embodiments of the disclosed subject matter.

FIG. 11 is an illustrative display screen of a predictive model evaluation application that can be used to display a particular result and data associated with the result in accordance with some embodiments of the disclosed subject matter.

FIG. 12 shows illustrative display screens of a predictive model evaluation application that can be used to provide an administrator user with information associated with annotator users in accordance with some embodiments of the disclosed subject matter.

FIG. 13 shows illustrative display screens of a predictive model evaluation application that can be used to provide an administrator user with result information associated with a particular annotator user in accordance with some embodiments of the disclosed subject matter.

FIG. 14 shows illustrative display screens of a predictive model evaluation application that can be used to create an administrator user account in accordance with some embodiments of the disclosed subject matter.

FIG. 15 shows illustrative display screens of a predictive model evaluation application that can be used to create an annotator user account in accordance with some embodiments of the disclosed subject matter.

DETAILED DESCRIPTION

Figure 1:
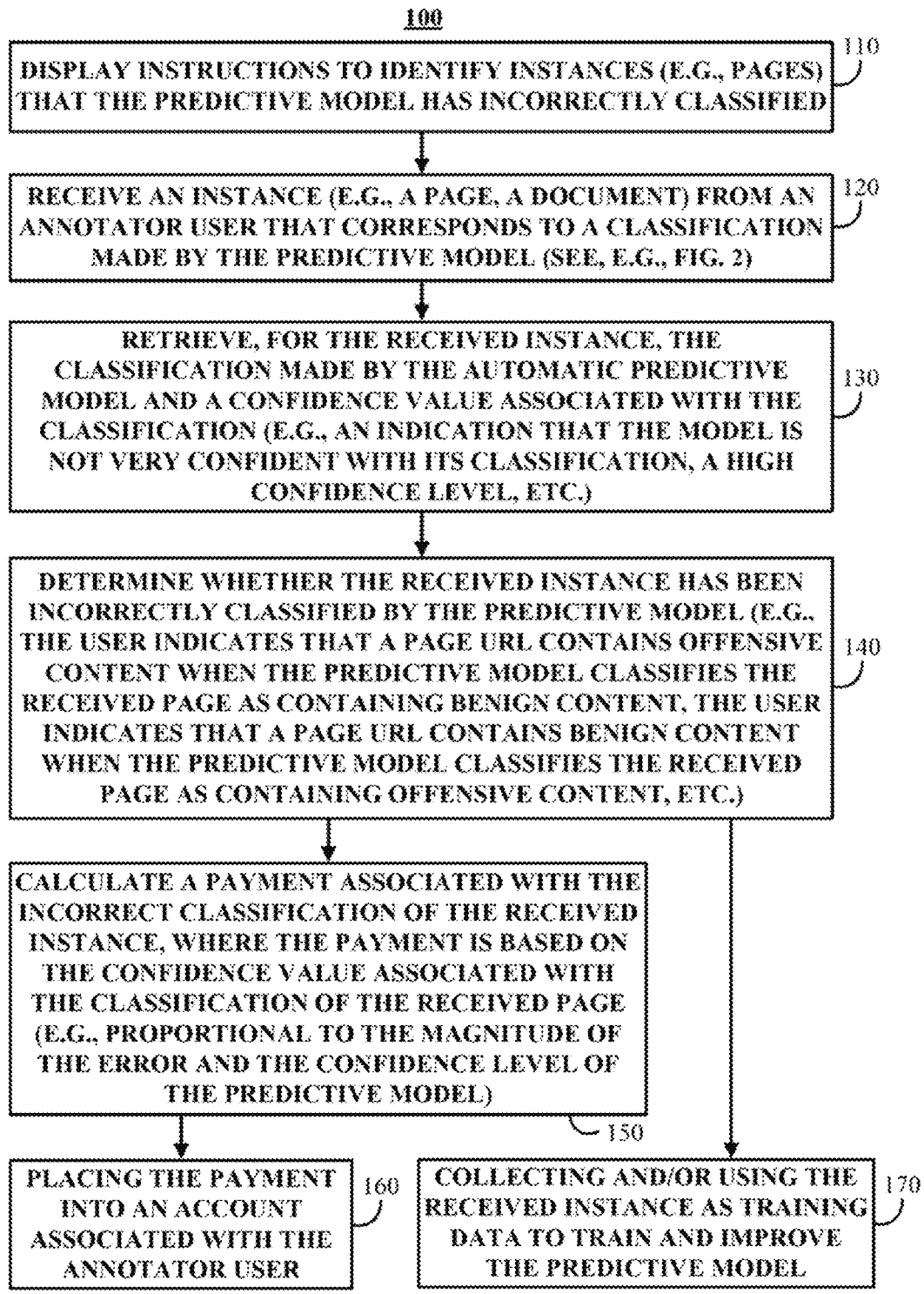
FIG. 1 is a flowchart of an illustrative process for receiving an instance (e.g., a page, a document, etc.) from an annotator user and evaluating the classification made by a predictive model in accordance with some embodiments of the disclosed subject matter.

Generally speaking, these mechanisms can receive an instance, such as a page, a uniform resource locator (URL), or a document, from an annotator user using a first processor and then determine, using a judge or any other suitable user at a second processor, whether the received instance was incorrectly classified by a predictive model. In response to determining that the received instance was incorrectly classified by the predictive model, the user using the first processor can receive a payment or any suitable reward for identifying the errors of the predictive model.

More particularly, these mechanisms can request that the annotator user provide instances that belong in a minority class and that are misclassified in a majority class (for example, pages that contain offensive content but are classified as containing benign content) and/or instances that belong in a majority class and that are misclassified in a minority class (for example, pages that contain benign content but are classified as containing offensive content). In addition, these mechanisms can provide a bonus payment based in part on a confidence value associated with the classification made by the predictive model. For example, if the predictive model has a low confidence value with its classification of the received instance, the bonus payment or reward to the annotator user can be small. On the other hand, if the predictive model has a high confidence value (e.g., a confidence value of about 100%) and, if it is determined that the predictive model incorrectly classified the instance, the bonus payment or reward to the annotator user can be high. Alternatively, if the predictive model has a low confidence value (e.g., a confidence value less than 50%) and if it is determined that the predictive model correctly classified the instance, a small bonus payment or small reward can be provided for verifying a classification having a low confidence value.

It should be noted that, although the embodiments described herein generally refer to the classification of web pages, websites, or sitelets, these mechanisms can be applied to any suitable classification or predictive model that receives any suitable input. For example, the instances can include documents, such as medical documents, and the mechanisms can receive a medical document that has been identified by an annotator user as misclassified by the predictive model as being relevant or not relevant to a particular informational need or criterion. In this example, the annotator user can received a bonus payment for identifying the misclassification made by the predictive model.

It should also be noted that, although the embodiments described herein generally refer to a payment being made in response to revealing a misclassification by a predictive model or a classification model or in response to verifying a classification having a low confidence level, any suitable reward can be made. For example, the reward can include goods and/or services, discounts on goods and/or services, credit towards the purchase of goods and/or services, etc. In another example, the reward can include reward points, where a payment is provided to the annotator user in response to accumulating a particular number of reward points.

These mechanisms can be used in a variety of applications. For example, these mechanisms can be used to evaluate an automatic predictive model and, more particularly, can be used to expose the errors of an automatic predictive model. That can, for example, be used to help protect advertisers, who (despite the efforts of their advertising agents or other marketing entities) may see their advertisements appear adjacent to objectionable content. Advertisers do not want their brands to be associated with such objectionable content and do not want to support such objectionable content, explicitly or implicitly, with their advertisement revenue. In another example, these mechanisms can be used to detect vulnerabilities in an automatic predictive model and indicate how the predictive model can be improved. The identified instances can be used as training data for the predictive model and/or can be used to modify the predictive model. This can include, for example, an automatic predictive model that already has a high level of accuracy or a high classification performance level.

Turning to FIG. 1, FIG. 1 is a flowchart of an illustrative process 100 for receiving an instance, such as a webpage, from an annotator user and evaluating the classification made by a predictive model in accordance with some embodiments of the disclosed subject matter.

Process 100 begins by using a predictive model evaluation application (sometimes referred to herein as "the application") to display instructions requesting that annotator users identify instances, such as pages, that the predictive model may have incorrectly classified. The displayed instructions can include a request to identify pages in the minority class that are misclassified in the majority class and/or a request to identify pages in the majority class that are misclassified in the minority class. For example, the predictive model evaluation application can, for a particular predictive model, request that an annotator user identify pages that contain offensive content and that is classified by the predictive model as containing benign content and/or pages that contain benign content and that is classified by the predictive model as containing offensive content.

Figure 2:
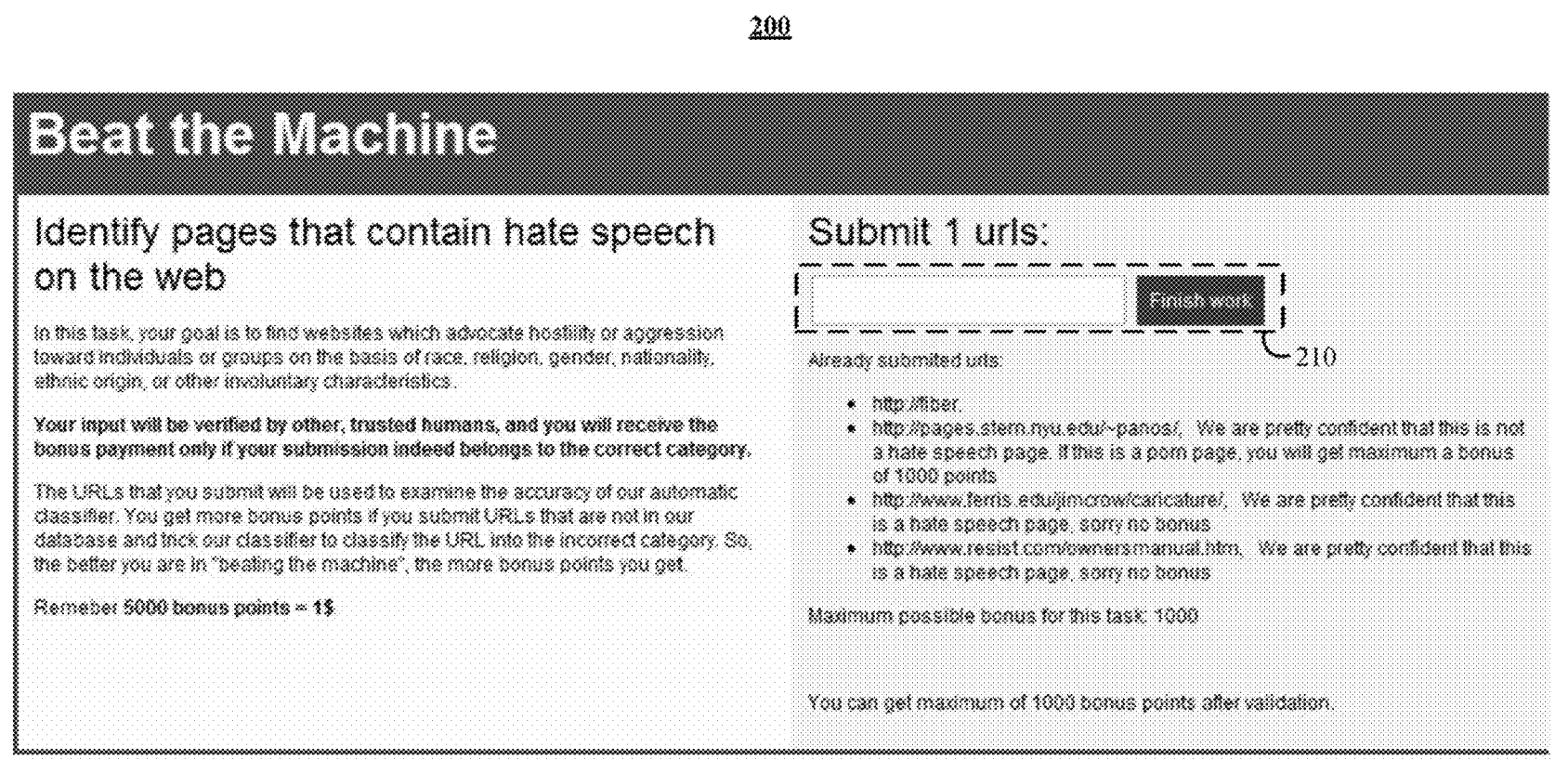

In a more particular example, an illustrative display screen generated by the predictive model evaluation application is shown in FIG. 2. As shown, display screen 200 can include an input region 210 for receiving one or more pages in the form of uniform resource locations (URLs) from an annotator user. In some embodiments, input region 210 can allow the annotator user to submit multiple pages to examine the accuracy of the automatic predictive model. It should be noted that, in some embodiments, the annotator user can select a task (e.g., identify pages that contain hate speech) or select a predictive model (e.g., one predictive model from a group of predictive models in a classification system) for providing instances. In response to the user selection, the predictive model evaluation application can provide the user with a display screen, such as display screen 200, associated with the task and/or predictive model for submitting instances.

In addition to input region 210, display screen 200 can include a description of the predictive model, a description of the task requested of the annotator user (e.g., identify pages that contain offensive content that is classified by the predictive model to contain benign content and/or pages that contain benign content that is classified by the predictive model as containing offensive content), a description of the bonus payment or reward available for identifying the error upon validation by an administrator user, etc. For example, as shown in FIG. 2, the annotator user is requested to identify pages that contain hate speech and, more particularly, to identify webpages that advocate hostility or aggression towards individuals or groups on the basis of race, religion, gender, nationality, ethnic origin, or other involuntary characteristics.

Figure 3:
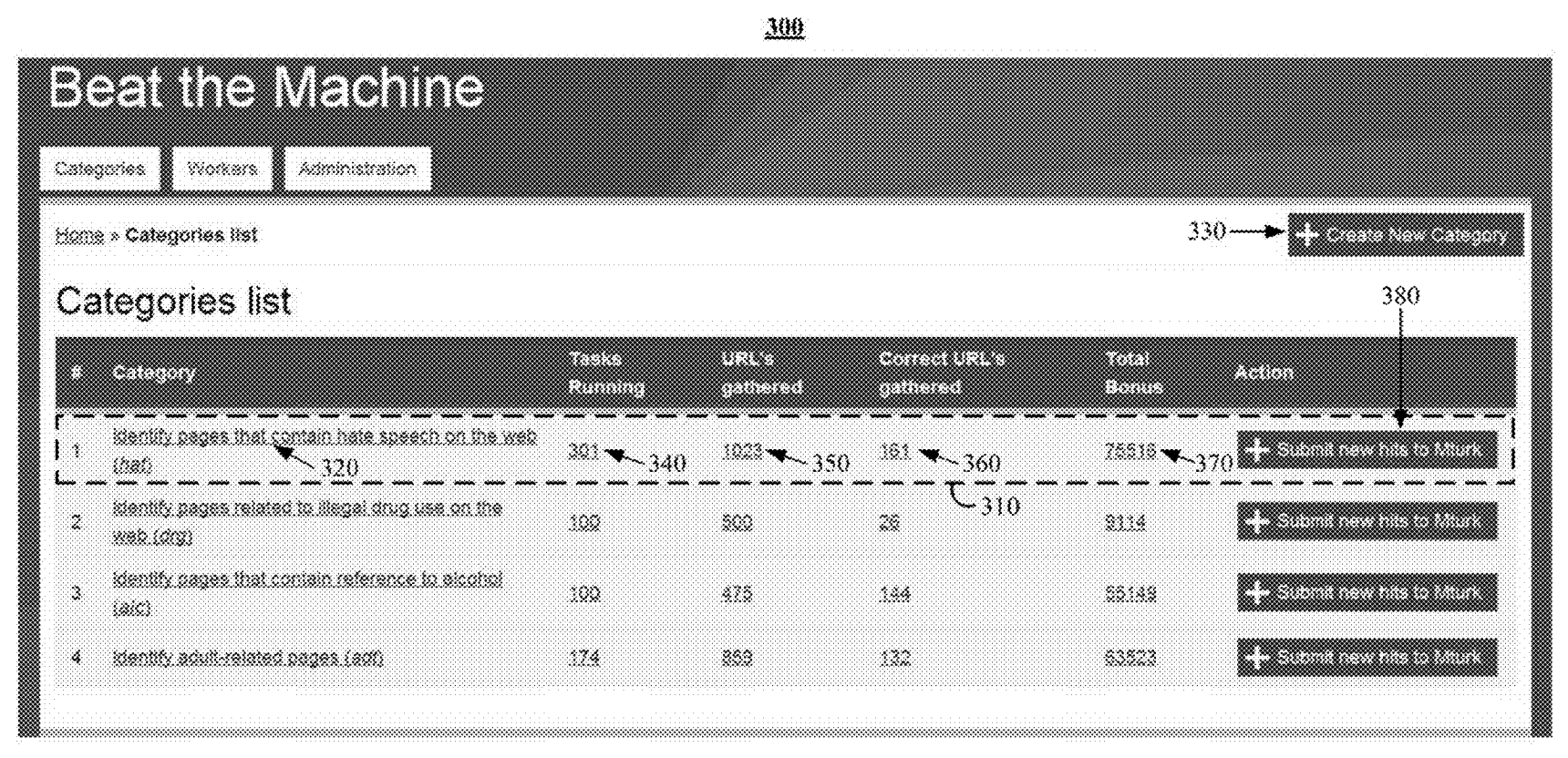

In some embodiments, the categories of interest can be created and/or modified by an administrator user. For example, as shown in FIG. 3, display screen 300 shows illustrative categories of interest for receiving instances from annotator users. In particular, row 310 of display screen 300 includes a particular category of interest created by an administrator user that requests annotator users to "identify pages that contain hate speech on the web (hat)." Other rows of display screen 300 include requests to identify instances relating to illegal drug use on the web, identify instances that contain a reference to alcohol, and identify adult-related instances.

Figure 4:
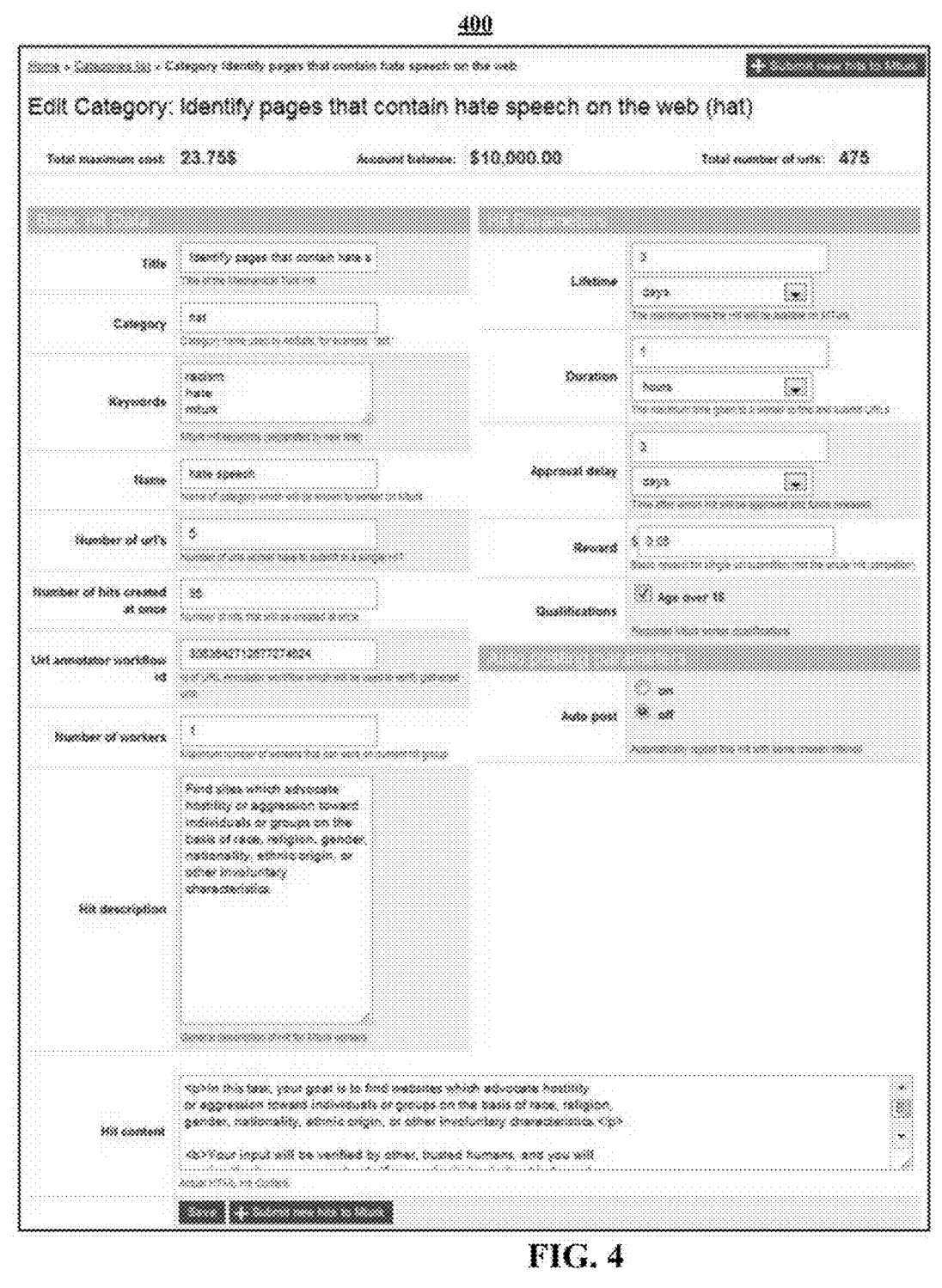

In response to selecting one of the categories, the predictive model evaluation application can allow the administrator user to modify information associated with the category. For example, as shown in FIG. 4, the predictive model evaluation application can allow the administrator user to enter or modify a category title or heading (e.g., "identify pages that contain hate speech on the web"), a category (e.g., hate speech, HAT, etc.), one or more category keywords (e.g., racism, hate, mturk, etc.), a name of the category (e.g., hate speech), a number of instances or pages for submission (e.g., one, five, etc.), a number of hits created at once (e.g., 95), an identifier of a URL annotator workflow used to verify gathered instances (e.g., 3063642712677274624), a maximum number of annotator users that can work on the current hit group (e.g., one), and/or a hit detailed description (e.g., find instances which advocate hostility or aggression towards individuals or groups on the basis of race, religion, gender, nationality, ethnic origin, or other involuntary characteristics). In the example shown in FIG. 4, the predictive model evaluation application provides the administrator user with an opportunity to input HTML code that describes the category or task requested of the annotator users. The inputted HTML code can then be used to present the description and/or instructions that are shown in display screen 200 of FIG. 2.

In some embodiments, the predictive model evaluation application can also allow the administrator user to set parameters relating to the submitted instances. For example, the predictive model evaluation application can provide a gaming environment or a game-like application for submitting instances that are incorrectly classified by the predictive model. In the example shown in FIG. 4, the predictive model evaluation application can allow the administrator user to set a lifetime parameter or the maximum time the particular hit is available for submitting instances (e.g., three days), a duration provided to an annotator user to find and submit instances (e.g., one hour), an approval delay parameter that a submitted instance is reviewed and bonus payment is released (e.g., three days), a reward for a single submission (e.g., five cents per submission, five points per submission, etc.), a maximum reward available for multiple submissions, an age qualification (e.g., over eighteen years old), etc. Accordingly, the predictive model valuation application can use the parameters set by the administrator user to provide a game-like predictive model evaluation application that incentivizes annotator users to submit instances (e.g., in the form of URLs) that defeat or are misclassified by the predictive model within a given period of time. The bonus payment or reward provided to the annotator user can be tied to the gaming parameters (e.g., a higher bonus payment for multiple instances within the first thirty minutes, a higher bonus payment for submitting more instances than an opponent annotator user, merchandise for particular submissions, etc.).

Additionally or alternatively, the predictive model evaluation application can allow the administrator user to create a category by, for example, selecting category creation option 330 shown in FIG. 3. In response to selecting category creation option 330, the predictive model evaluation application can present the administrator user with an interface for inputting category information and parameters, such as display screen 400 of FIG. 4.

Referring back to FIG. 1, process 100 can then receive an instance from an annotator user at 120. For example, as described above, an annotator user can submit one or more pages through display screen 200 of FIG. 2 for use in evaluating the accuracy of the automatic predictive model. In response to receiving an instance from an annotator user, the predictive model evaluation application can determine the classification of the instance made by the automatic predictive model or classify the instance using the automatic predictive model.

In some embodiments, an annotator user can select a category, a task, or a predictive model for providing one or more instances. For example, an annotator user can access a category list, such as the one shown in FIG. 3, and select a category (e.g., identify adult-related pages) from the category list. In response to selecting a category, the predictive model evaluation application can direct the annotator user to a display screen (e.g., display screen 200 of FIG. 2) that describes the task and allows the annotator user to submit one or more instances corresponding to the described task.

In a more particular embodiment, the predictive model evaluation application can determine whether the instance received from the annotator user has been previously classified and whether the associated classification information is stored in a database at 130. For example, the predictive model evaluation application can transmit a query to a database that includes the received instance and/or related instance information (e.g., a page and its words, links, images, metadata, etc.) and, in response, receive the classification associated with the received instance from the database. The classification made by the automatic predictive model can include, for example, an indication that the page does or does not contain objectionable content. The classification can also include an indication that the instance belongs or does not belong to a particular class.

It should be noted that, in some embodiments, the indication of objectionable content on one or more of these instances (e.g., webpages) can generally be defined as having a severity level in a particular category of interest. For example, an adult content category can have various severity levels, such as a G rating, a PG-13 rating, a PG rating, an R rating, an NC-17, and an X rating. In another example, an adult content category and a hate speech category can be combined to form one category of interest. In yet another example, unlike the adult content category example, the indication can include a positive event (e.g., good, yes, does not contain hate speech, etc.) and a negative event (e.g., bad, no, contains hate speech, etc.).

It should also be noted that, in some embodiments, the indication of objectionable content can include the classification, rating, or severity level along with an identifier of the category of interest. For example, the automatic prediction model can determine whether an instance contains hate speech (HAT) and, in response to analyzing the instance information, the automatic prediction model can determine that the instance should receive a G level rating. Accordingly, the classification can include a combination of the severity level and the category of interest identifier, such as "HAT-G" for a page determined to contain G level content relating to hate speech or "ALC-YES" for a page determined to contain content relating to alcohol (ALC).

Alternatively, in response to determining that the instance has not been previously classified by the automatic prediction model, the received instance and/or related instance information (e.g., a page and its words, links, images, metadata, etc.) can be transmitted to the automatic predictive model for classification. As described above, the automatic predictive model can return a classification that includes a severity level, such as a G level rating. As also described above, the automatic predictive model can return a combination of the severity level and the category of interest identifier, such as "HAT-G" for a page determined to contain G level content relating to hate speech (e.g., racist content, anti-Semitism, etc.) or "ADT-NO" for a page determined to not contain adult content.

In some embodiments, the predictive model evaluation application can retrieve a confidence value associated with the classification of the instance by the predictive model. For example, in addition to classifying a particular page as not containing adult content (e.g., "ADT-NO"), the predictive model can also indicate a confidence level associated with that classification. In a more particular example, the confidence value can be a confidence level, such as "not very confident" to "highly confident." In another more particular example, the confidence value can be a numeric confidence level, such as a confidence level in the form of a number between 0 and 10 or a confidence level in the form of a percentage between 0% (not confident) and 100% (highly confident). Any suitable approach can be used to indicate a confidence level, such as, for example, a confidence identifier (e.g., not confident) when a confidence value is below a particular threshold confidence level (e.g., 10%).

Referring back to FIG. 1, upon determining the classification made by the predictive model and the confidence value, the predictive model evaluation application can determine whether the received instance has been incorrectly classified by the predictive model. For example, in response to determining that the predictive model has classified the received page as "HAT-G" (containing G rated content for hate speech) and determining that the predictive model is 90% confident in the classification, the predictive model evaluation application can determine whether the received page was incorrectly classified and actually contains content that includes hate speech or contains content that a G rating is not appropriate.

In some embodiments, the predictive model evaluation application can determine whether the predictive model has misclassified an instance as belonging to the majority class and the annotator user has indicated that the instance belongs in the minority class. In a more particular example, the predictive model evaluation application can determine whether the predictive model has misclassified a page as containing benign content, but the annotator user has indicated that the page contains offensive content. Similarly, the predictive model evaluation application can determine whether the predictive model has misclassified an instance as belonging to the minority class and the annotator user has indicated that the instance belongs in the majority class. In a more particular example, the predictive model evaluation application can determine whether the predictive model has misclassified a page as containing offensive content, but the annotator user has indicated that the page contains benign content.

It should be noted that, in some embodiments, the predictive model evaluation application can transmit the instance to an administrator user, a judge, or any other suitable entity to determine whether the instance has been incorrectly classified by the predictive model. For example, in response to selecting page link 350 in display screen 300 of FIG. 3, the predictive model evaluation application can provide the administrator user with a list of pages gathered by multiple annotator users. In particular, display screen 500 of FIG. 5 illustrates four annotator user groups that are identified by a unique annotator identifier for a particular task. In response to selecting a unique annotator identifier shown in FIG. 5, the predictive model evaluation application can provide the administrator user with a list of instances (e.g., pages) submitted by the one or more annotator users associated with the unique annotator identifier.

It should also be noted that, in some embodiments, the predictive model evaluation application can inhibit particular instances from being transmitted to an administrator user, a judge, or any other suitable entity for verifying the classification. For example, as described above, the predictive model evaluation application can determine whether the predictive model has misclassified a page as belonging to the majority class and the annotator user has indicated that the page belongs in the minority class and/or whether the predictive model has misclassified a page in the minority class and the annotator user has indicated that the page belongs in the majority class. If the predictive model evaluation application determines that the submitted instance does not meet at least one of these parameters, the predictive model evaluation application can reject the submitted instance and not award a bonus payment to the associated annotator user for the submission.

In a more particular example, if the predictive model evaluation application requests that annotator users find instances that are misclassified hate speech pages, the predictive model evaluation application can reject instances that the predictive model unambiguously classified as hate speech. In another more particular example, the predictive model evaluation application can compare the classification made by the predictive model with the classification or annotation submitted by the annotator user. In response to comparing the classifications and determining that the classification made by the predictive model (e.g., ADT-G) and the classification or annotation submitted by the annotator user (e.g., ADT-G) are the same and in response to reviewing the confidence level of the predictive model for this classification (e.g., 90%), the predictive model evaluation application can determine that the annotation submitted by the annotator user is not providing the predictive model with new or updated information and is, therefore, not eligible for a bonus payment. This submission by the annotator user can be rejected prior to transmitting the submission to an administrator user or judge for verification.

As described above, the predictive model can classify an instance and assign a confidence value to the classification. It should be noted that the predictive model evaluation application can incentivize annotator users to discover significant errors made by the predictive model (sometimes referred to herein as "unknown unknowns") in comparison with errors that are lesser in magnitude (sometimes referred to herein as "known unknowns").

Let x represent an example belonging to some problem space X. In classification settings, x has a true label $\bar{y}$ from some set of possible labels Y. The task of a classification is to construct a predictive model, f(x), that can estimate a label for each incoming example (y=f(x)) such that the estimated label y mirrors the (generally hidden) true label $\bar{y}$ as closely as possible. In this particular example, models that output a posterior probability estimate over the set of available labels, that is, p(y|x)=f(x), can be reviewed. Such probability can then be used to select a preferred label, for example, by choosing the y with the highest probability, or in a cost-sensitive setting, choosing the example with the least expected cost. It should be noted that, in some embodiments, one or more approaches for transforming hard-labeling models into probability estimators can be used.

In connection with determining known unknowns, let $M(x) = 1 - p(\hat{y}|x)$, where $\hat{y} = \arg\max_y p(y|x)$, the class with the greatest expected posterior. Let c E [0,1] be a confidence threshold or value denoting a radius from the decision boundary and let x' be an example with $M(x') \leq \epsilon$. x' is said to be a known unknown if for x', $\hat{y} \neq \bar{y}$. It should be noted that the e-radius around the decision boundary can correspond to an uncertainty region or an area where the predictive model is unsure of itself with regarding to classifications and where mistakes or misclassifications are likely to be made.

In some embodiments, the region of uncertainty around the decision boundary can be used by the predictive model to identify those examples where prediction or classification should be deferred. Classification with a rejection option can be provided, where in addition to labeling each example with some y∈Y, the predictive model evaluation application can additionally defer prediction or classification, either by ignoring an example entirely or sending the example of a domain expert or any other suitable user for manual evaluation. It should be noted that, as such rejection of an example may come at a non-trivial cost q(x), the task of classification with a rejection option can be used to balance the expected misclassification costs with the cost of the rejection option.

Let cost $(y^k|y^j)$ encode the penalty for predicting $f(x)=y^k$ when, in fact, the true label for x is $y^j$. In this example, based on the posterior probability estimates generated by f(x), a model can choose the $y^k$ that minimizes the expected misclassification cost:

$$L(x, y^k) = \sum_{y' \in Y} p(y = y' | x) \text{cost}(y^k | y')$$

Let the setting with balance misclassification costs, that is, w.l.o.g., cost $(y^k|y^j)=_1$ whenever $y^k \neq y^j$ with 0 costs for correct label attribution. In this example, the optical rejection option policy, $\mathcal{A}$, offering a minimum rejection rate for a given expected error probability (or, equivalently, minimizing the expected error probability for a given rejection rate) can be represented by:

$$\mathcal{A} = \left\{ x \middle| \min_c \hat{p}(y = c | x) > q(x) \right\}$$

Figure 6:
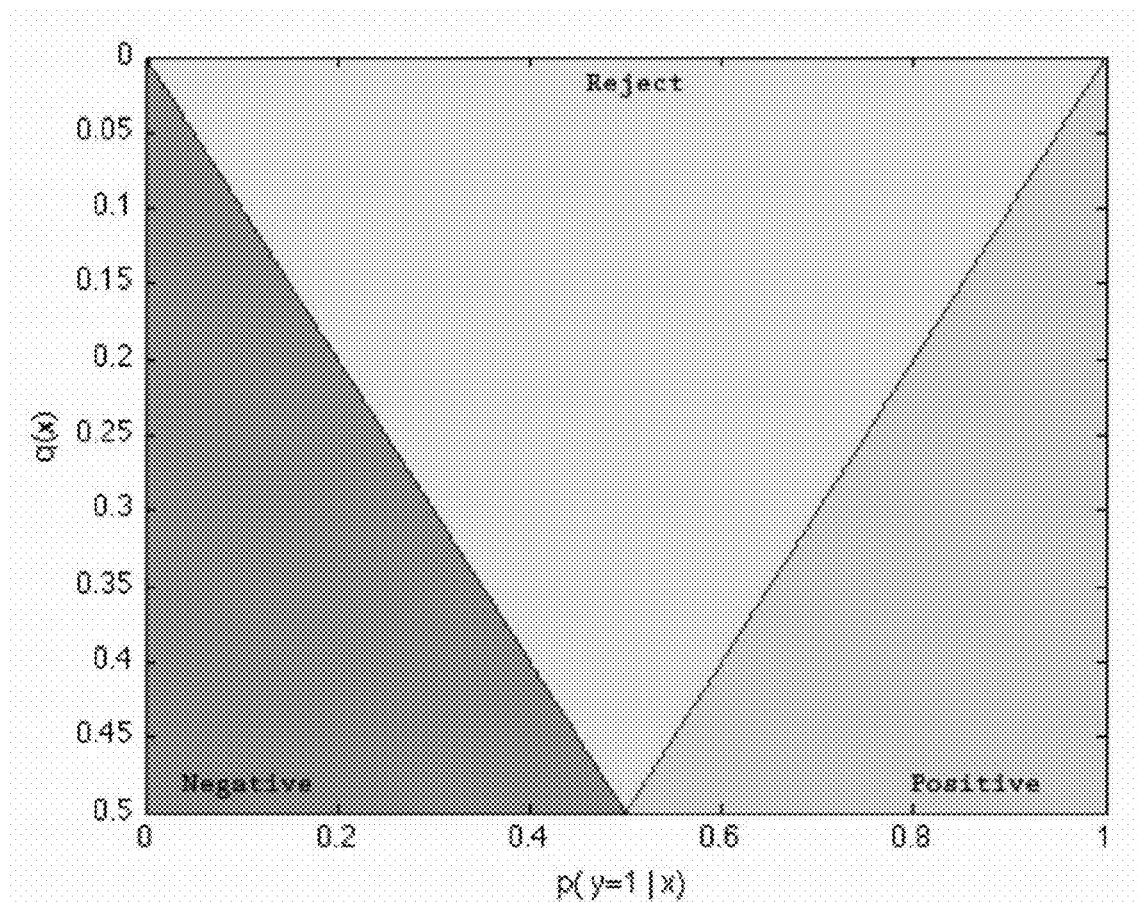
FIGS. 6 and 7 are illustrative graphs including decision regions for varying query costs as a function of the posterior probability in accordance with some embodiments of the disclosed subject matter.

It should be noted that, as shown in the above-identified equation, larger query costs tend to prevent much of the efficacy of the rejection option. The rejection option may not be exercised with (x)>1/2. In some embodiments, it may be optimal to query the oracle when q(x)=0, thereby yielding zero misclassification risk assuming a perfect oracle. For example, FIG. 6 illustrates the decision regions for varying query costs as a function of the posterior probability, p(y=1|x). As shown in FIG. 6, it may not be advantageous to query an oracle once the costs exceed 0.5.

In some embodiments, the predictive model evaluation application can extend the rejection option from uniform misclassification costs to asymmetric misclassification costs. For example, this can be represented by:

$$\mathcal{A} = \left\{ x \middle| \min_{\hat{y}} L(x, \hat{y}) > q(x) \right\}$$

Figure 7:
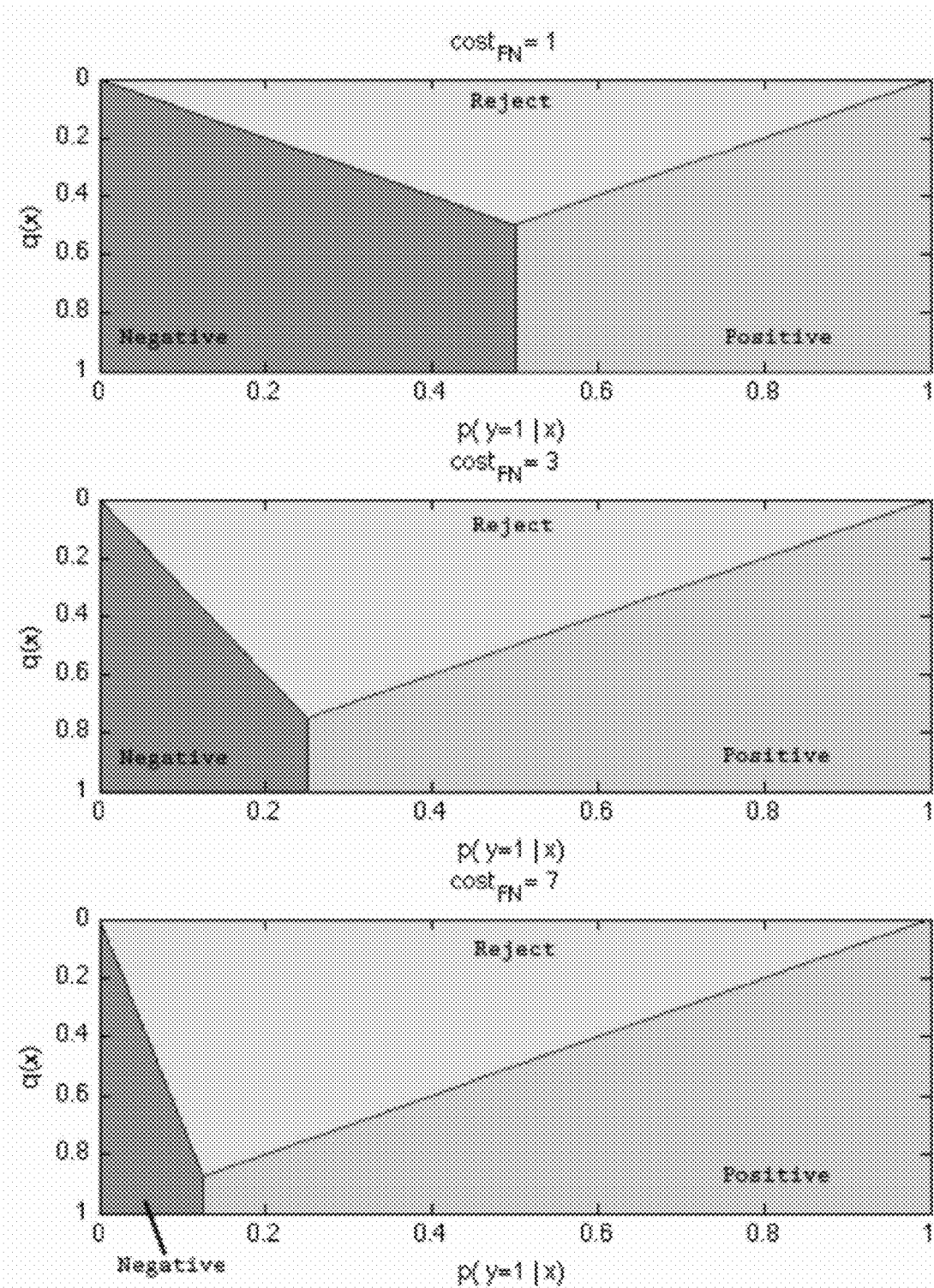

As in the case with symmetric cost classification with a rejection option, there are certain regions of the posterior/cost space where predictions should be rejection and where certain labels should be chosen. FIG. 7 illustrates these regions for a binary classification as a function of the posterior, p(y=1|x), and of a uniform label cost, q(x), for three different cost settings. It should be noted that, in order to reduce complexity for these examples, a correct classifications is deemed to have zero cost and a false positive is deemed to have a cost of 1—e.g., cost (1|0)=1, varying only cost (0|1). This can consider the ratio of false negative costs to false positive costs and re-normalizing.

In the context of classification with a rejection option, known unknown are those errors that are expected based on the confidence level of the classification. These may be cases where it may be less costly to use the rejection option than the make a risky label prediction. The uncertainty radius, $\epsilon$, can be viewed as a constant q(x) across all x. However, while it may be important to understand the mistakes or errors that the predictive model is known to make and to react in an appropriate manner, predictive models in production often make mistakes far from this area of predictive uncertainty. For example, for a hate speech classification system, the predictive model is likely to encounter examples eliciting a high degree of predictive uncertainty (e.g., an encyclopedia entry discussing racial issues or a history of racism). By capturing known unknowns, the predictive model can react to these borderline examples and, in some embodiments, estimate the predictive model's overall exposure to misclassification risk. However, there may be situations where the predictive model assigns a label or classification with high confidence (e.g., a confidence level near 100%) and be incorrect. As described above, these are the unknown unknowns.

In connection with determining unknown unknowns, let $M(x)=1-p(\hat{y}|x)$ and let $\epsilon \in [0,1]$ be a confidence threshold or value denoting a radius from the decision boundary. In this example, x' is said to be an unknown unknown if $M(x')>\epsilon$. It should be noted that x' is outside the region of uncertainty, but $\hat{y} \neq \bar{y}$. That is, the example is misclassified by the predictive model, but the predictive model is certain that the example was correctly classified.

It should be noted that there may be tradeoffs between the number of examples lying within a predictive model's radius of uncertainty and the number of unmitigated mistakes (unknown unknowns) made by the predictive model. In a linear example, as the radius of uncertainty increases, the number of points considered uncertain also increases, thereby increasing the cost of handling the uncertain instances. However, it should also be noted that increasing the radius of uncertainty also decreases the number of unknown unknowns, thereby decreasing the corresponding cost for handling unknown unknowns.

In some embodiments, the predictive model evaluation application can includes additional models, such as a k-NN model that includes a set of training examples selected randomly from the problem space. For example, as shown in FIG. 8, the tradeoff between unknown unknowns and problem uncertain are shown for a linear model 810, a k-NN model 820, and a hybrid model 830 for various training examples (e.g., 150 training examples, 1,500 training examples, and 15,000 training examples). As shown for the k-NN model 820, the efficacy depends both on the setting of the radius of uncertainty (E) and the coverage of the problem space quantified by the number of training examples. More particularly, given a substantial coverage over the problem space, the k-NN model 820 can reduce the cost of unknown unknowns substantially over the linear model while offering a slight uncertainty overhead. For the linear model 810, the percentage of unknown unknowns decreases rapidly as the uncertainty boundary expands from the decision threshold. That is, coverage over the points that would be incorrectly classified in the noisy region around the decision boundary is provided.

It should be noted that the k-NN model 820 is generated with randomly selected training examples and, as such, coverage may be wasted on uninteresting portions of the problem space. In response, the predictive model evaluation application can concentrate the set of training examples around the decision boundary to provide steeper coverage of the incorrectly classified points. Such a dataset can be obtained using active learning described, for example, in commonly-owned, commonly-assigned U.S. patent application Ser. No. 12/986, 108, filed Jan. 6, 2011, which is hereby incorporated by reference herein in its entirety.

An illustrative example of a hybrid model 830 that combines linear model 810 with k-NN model 820 is shown in FIG. 8. In this example, the component with the greatest degree of label certain can be used for making a label prediction. Such a hybrid model 830 provides initial coverage of mistakes near the decision boundary; yet provides an overly broad uncertainty region as the radius of certainty increases. The predictive model evaluation application can increase the number of training examples to improve the cost tradeoffs. In some embodiments, the predictive model evaluation application can select a few examples in or near the disjunctive subregions that are being misclassified by the predictive model, thereby keeping data acquisition costs low.

Referring back to FIG. 1, upon determining that the instance has been misclassified by the predictive model, the predictive model evaluation application can calculate a bonus payment or reward associated with the incorrect classification of the received instance. It should be noted that, in some embodiments, the predictive model evaluation application can incentivize annotator users to discover significant errors made by the predictive model (sometimes referred to herein as "unknown unknowns") in comparison with errors that are lesser in magnitude (sometimes referred to herein as "known unknowns"). For example, the predictive model evaluation application can calculate the bonus payment or reward based the confidence value associated with the received instance. That is, the predictive model evaluation application can reward annotator users for revealing misclassifications proportional to the confidence level of the predictive model or the magnitude of the error. In a more particular example, when the predictive model is not particularly confident of the classification of a submitted URL (e.g., 5% confident) and the predictive model made an incorrect classification of the submitted URL, the predictive model evaluation application can provide a small bonus payment or reward to the associated annotator user as this error was a "known unknown." On the other hand, when the predictive model is particularly confident of the classification of a submitted URL (e.g., a classification close to 100%) and the predictive model made an incorrect classification of the submitted URL, the predictive model evaluation application can provide a significant bonus payment or reward (e.g., the highest available reward) to the associated annotator user as this error was an "unknown unknown." When the confidence level is a bit lower (e.g., 75% confidence as opposed to 100%), the calculated bonus payment or reward can be proportionally smaller.

In some embodiments, the predictive model evaluation application can calculate a bonus payment or reward in response to determining that the predictive model correctly classified the submitted instance (e.g., URL) and in response to determining that the confidence level of the classification is a low (e.g., below a particular threshold confidence level), the predictive model evaluation application can provide the annotator user with a small bonus payment or small reward for confirming the classification, thereby increasing the confidence level associated with the classification. For example, if the predictive model predicted that a submitted instance is 60% likely to contain hate speech and the annotator user indicated that the submitted page does indeed contain hate speech, the annotator user can be provided with a small bonus payment or small reward for the submitted instance and for increasing the confidence level of the predictive model.

Referring back to FIG. 1, the predictive model evaluation application can place the bonus payment into an account associated with the annotator user at 160. For non-monetary rewards (e.g., merchandise, goods, services, discounts on goods or services, etc.), the predictive model evaluation can transmit the reward to the annotator user. Alternatively, the predictive model evaluation application can provide the annotator user with a number of reward points for one or more submissions and, in response to determining that the number of reward points exceeds a particular value, the predictive model evaluation application can place a payment (e.g., equivalent to a particular number of reward points) into an account associated with the annotator user.

It should be noted that, in some embodiments, the predictive model evaluation application can transmit a provisional bonus payment to the associated annotator user in response to submitting a page, determining that the instance may have been misclassified by the predictive model, and determining the confidence level associated with the classification. The instance information, classification information, and/or any other suitable information can be transmitted to an administrator user or a judge for inspection and/or verification of the submitted content by the administrator user or the judge. For example, provisional bonus points that correspond to a cash reward can become permanent in response to verification by the administrator user. In another example, provisional bonus points can be transmitted to an account associated with the annotator user and, in response to verifying the submission, the provisional bonus points can correspond to a cash reward that is paid to the annotator user. In yet another example, upon determining that the account associated with the annotator user reaches a particular value (e.g., a particular number of bonus points or a particular amount of cash), the predictive model evaluation application can place the payment into a bank account associated with the annotator user.

By incentivizing annotator users to identify errors in the predictive model, the predictive model evaluation application can identify significant errors and potentially catastrophic failures made by the predictive model. This can, for example, warn about failures that the automatic predictive model cannot identify by itself. Moreover, understanding these errors in the predictive model can be used to improve the predictive model. For example, referring back to FIG. 1, the submitted instances that identify errors in the predictive model can be used as training instances to train and improve the predictive model at 170.

It should be understood that the above steps of the flow diagram of FIG. 1 and any other flow diagrams described herein can be executed or performed in any order or sequence not limited to the order and sequence shown and described in the figure. That is, some steps can be added, some steps may be omitted, and/or the order of the steps may be re-arranged. Also, some of the above steps of the flow diagram of FIG. 1 can be executed or performed substantially simultaneously where appropriate or in parallel to reduce latency and processing times. For example, the predictive model evaluation application can substantially simultaneously calculate a bonus payment for a particular submitted instance and apply the instance as training data to improve the predictive model.

In some embodiments, the predictive model evaluation application can provide an administrator user with particular features for managing categories, verifying submitted instances (e.g., pages), creating administrator user or judge accounts, etc. Referring back to FIG. 3, the predictive model evaluation application can provide the administrator user with a list of categories and, for each category, allow the administrator user to review the tasks running for a particular category (e.g., in response to selecting link 340), the submitted instances by various annotator users (e.g., in response to selecting link 350), the submitted instances that are eligible for a bonus payment or reward (e.g., in response to selecting link 360), the total bonus payments paid or rewards provided for a particular category (e.g., in response to selecting link 370), etc. As also shown in display screen 300 of FIG. 3, the predictive model evaluation application can, in response to selecting a submission link 380, provide the administrator user with an opportunity to submit new hits to a crowdsourcing or micro-outsourcing application (e.g., Amazon's Mechanical Turk) for receiving URL submissions.

Figure 9:
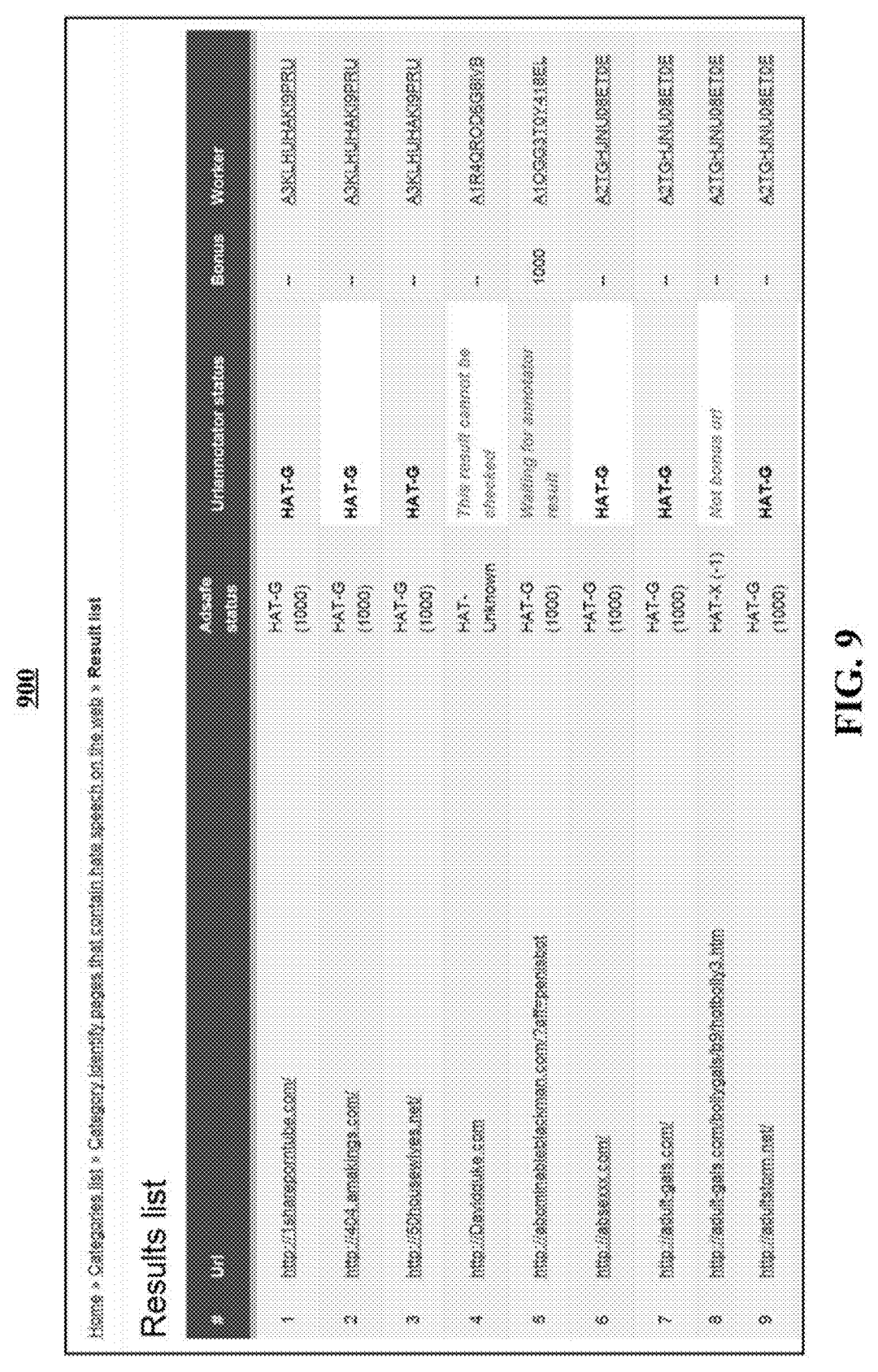

In a more particular example, in response to selecting link 350, the predictive model evaluation application can provide the administrator user with a display screen 600 that includes instances submitted by annotator users and additional result information. As shown in display screen 900 of FIG. 9, each result in the list includes the submitted instance in the form of a URL, a classification of the predictive model (e.g., HAT-G (1000), which indicates that the content on the instance received a G rating with respect to hate speech and which indicates that the maximum bonus payment is 1000 points), a classification of the annotator user (e.g., HAT-X, which indicates that the content on the instance received an X rating with respect to hate speech from the annotator user), a bonus payment awarded for the submission from the annotator user, and a unique annotator user identifier that identifies the annotator user. As also shown in display screen 900 of FIG. 9, the predictive model evaluation application can provide the administrator user with an indication of which instances are awaiting a submission from an annotator user, which instances are awaiting verification from an administrator user, which instances are not eligible for a bonus payment or a reward, etc.

In a more particular example, in response to selecting link 360 to review instances eligible for a bonus payment or a reward and/or link 370 to review the instances that comprise the total bonus awarded for a given category, the predictive model evaluation application can provide the administrator user with a display screen 1000 that includes instances submitted by annotator users and bonus payment information associated with the submissions. As shown in display screen 1000 of FIG. 10, each result in the list includes the submitted instance in the form of a URL, an incorrect classification made by the predictive model (e.g., HAT-G (1000), which indicates that the content on the instance received a G rating with respect to hate speech and which indicates that the maximum bonus payment is 1000 points), a classification of the annotator user (e.g., HAT-PG, which indicates that the content on the particular instance received an PG rating with respect to hate speech from the annotator user), a bonus payment or reward awarded for the submission from the annotator user (e.g., 325 points which is proportional to the magnitude of the error and/or the confidence level of the predictive model), and a unique annotator user identifier that identifies the annotator user.

In response to selecting result link 1010 from the list of results, the predictive model evaluation application can provide the administrator user with detailed information relating to the submitted instance, the misclassification or unconfident classification made by the predictive model, the bonus payment or the reward, etc. An illustrative example of the detailed information relating to a particular result is shown in FIG. 11.

Figure 12:
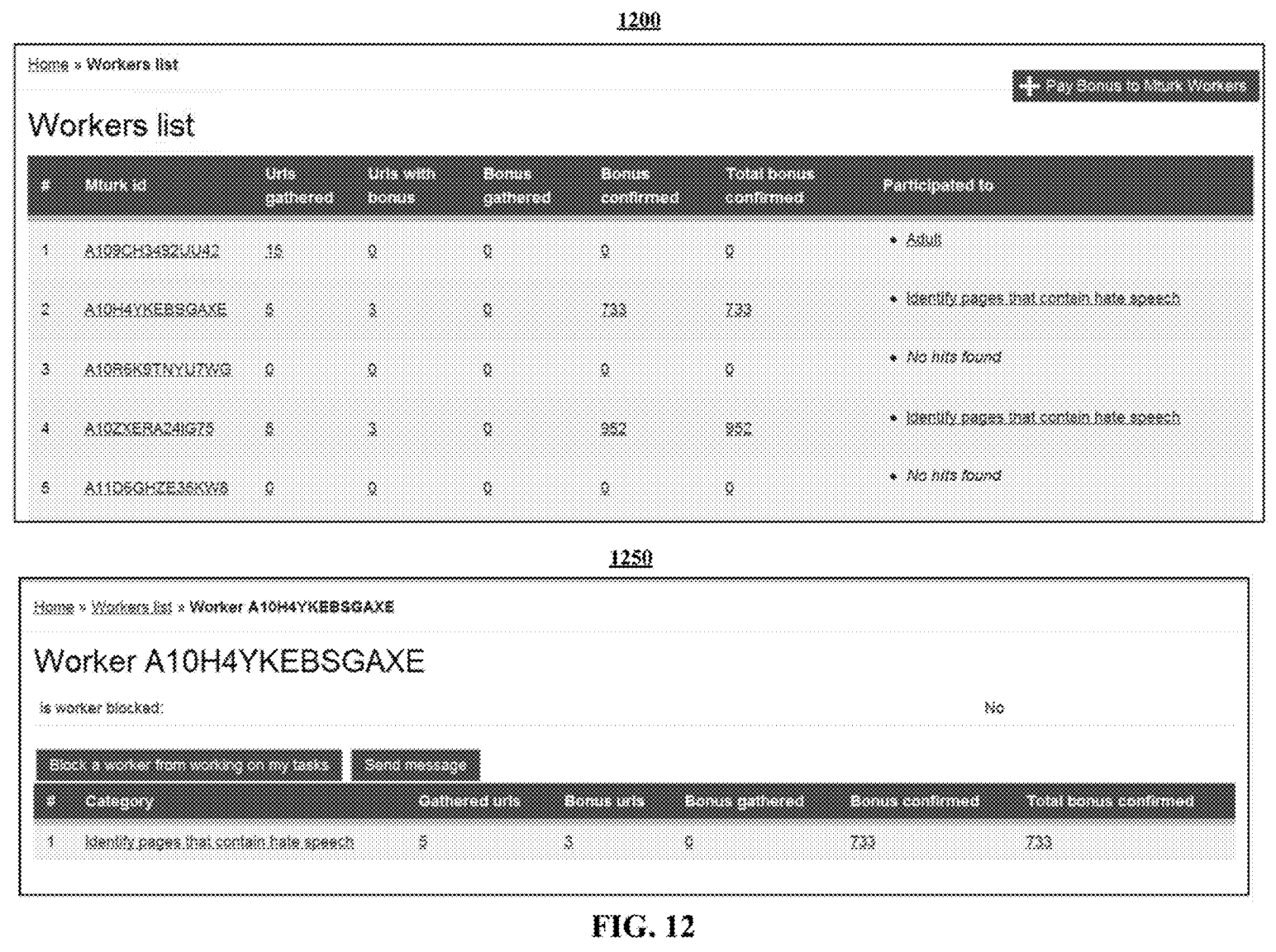

In some embodiments, the predictive model evaluation application can provide the administrator user with submission, classification, and/or bonus information corresponding to particular annotator users. For example, as shown in FIG. 12, the administrator user can be provided with a display screen 1200 that includes a list of annotator users. More particularly, each annotator user is identified by a unique annotator user identifier along with the instances submitted by the particular annotator user, the instances submitted by the particular annotator user that received a bonus payment or a reward, a bonus gathered by the particular annotator user, a bonus confirmed for the particular annotator user, a total bonus confirmed for the particular annotator user, and/or the one or more categories that the particular annotator user has participated.

As shown in display screen 1250 of FIG. 12, the administrator user can select an annotator user from a list of annotator users to retrieve submission, classification, and/or bonus information corresponding to the selected annotator user. For example, as shown in FIG. 13, the predictive model evaluation application can provide the administrator user with a list of the instances submitted by the particular annotator user (e.g., display screen 1300) and/or a list of the instances submitted by the particular annotator user that received a bonus payment (e.g., display screen 1350).

In some embodiments, the administrator user can review the submission, classification, and/or bonus information corresponding to the selected annotator user and send a message to the annotator user (e.g., a warning regarding the instances submitted by the annotator user), block the annotator user from participating on the particular category, block the annotator user from participating in any category created by the administrator user, etc.

Figure 15:
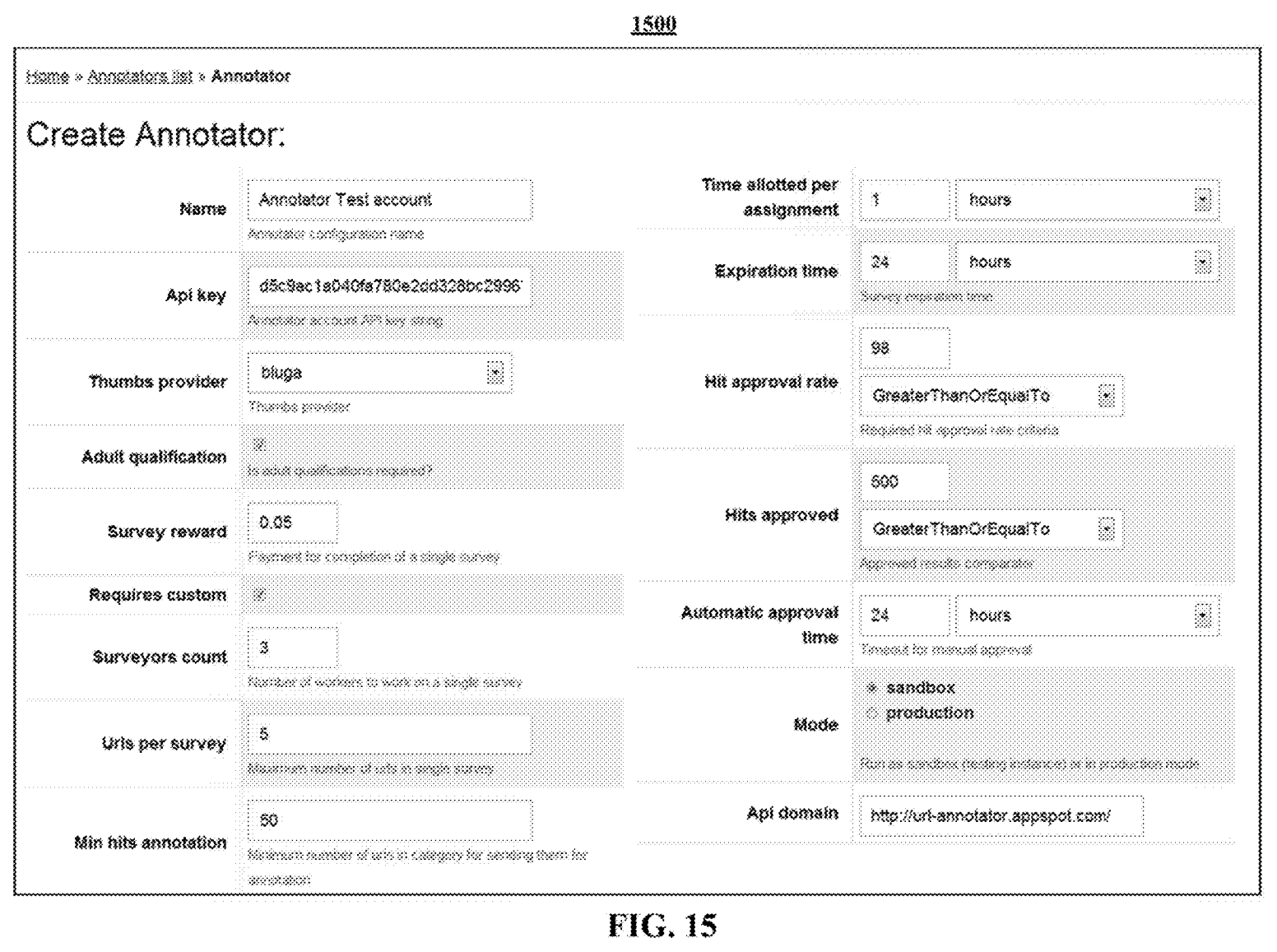

In some embodiments, the predictive model evaluation application can provide the administrator user with the opportunity to create various user accounts, such as administrator user accounts shown in FIG. 14 and annotator user accounts shown in FIG. 15. More particularly, as shown in display screen 1400 of FIG. 14, an administrator user account can be created that includes a name, an application program interface (API) key for verifying pages, a secret key string for the API key, a local address, a mode (e.g., a testing mode or a production mode), a minimum bonus payment or reward that can be sent to an annotator user (e.g., one bonus point, one dollar, one penny, etc.), a number of bonus points that is equivalent to one dollar (e.g., 5000 points equals one dollar), and an account balance of available funds for providing bonus payments (e.g., determined based on the number of instances and, more particularly, unknown unknowns the administrator user desires to uncover). Turning to FIG. 15, an annotator user account can be created that includes an annotator username, an annotator account API key, an adult qualification, a survey reward, a number of annotator users that can work on a single survey, the maximum number of instances in a single survey, the maximum number of instances in a category for sending for annotation, a time allotted per assignment, an expiration time, a required hit approval rate, a number of hits approved, a mode (e.g., a testing instance vs. a production instance), an API domain, etc.

Figure 16:
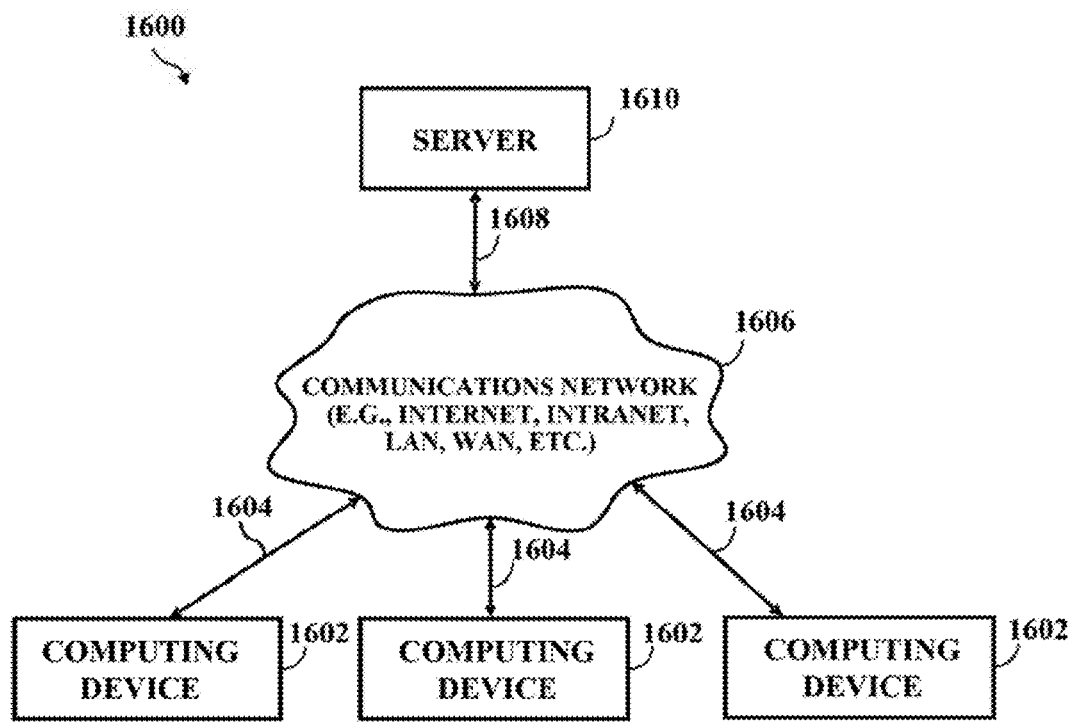
FIG. 16 is a diagram of an illustrative system on which the predictive model evaluation application can be implemented in accordance with some embodiments of the disclosed subject matter.

FIG. 16 is a generalized schematic diagram of a system 1600 on which the predictive model evaluation application can be implemented in accordance with some embodiments of the disclosed subject matter. As illustrated, system 1600 can include one or more computing devices 1602, each of which can be used to submit URLs or any other suitable instances for verification. Computing devices 1602 can be local to each other or remote from each other. Computing devices 1602 are connected by one or more communications links 1604 to a communications network 1606 that is linked via a communications link 1608 to a server 1610.

System 1600 can include one or more servers 1610. Server 1610 can be any suitable server for providing access to the predictive model evaluation application, such as a processor, a computer, a data processing device, or a combination of such devices. For example, the predictive model evaluation application can be distributed into multiple backend components and multiple frontend components or interfaces. In a more particular example, backend components, such as data collection of predictive model classification information and confidence level information and data distribution can be performed on one or more servers 1610. Similarly, the graphical user interfaces displayed by the predictive model evaluation application, such as a data interface for submitting instances or a data interface for reviewing instances or annotator user information, can be distributed by one or more servers 1610 to computing device 1602.

Figure 17:
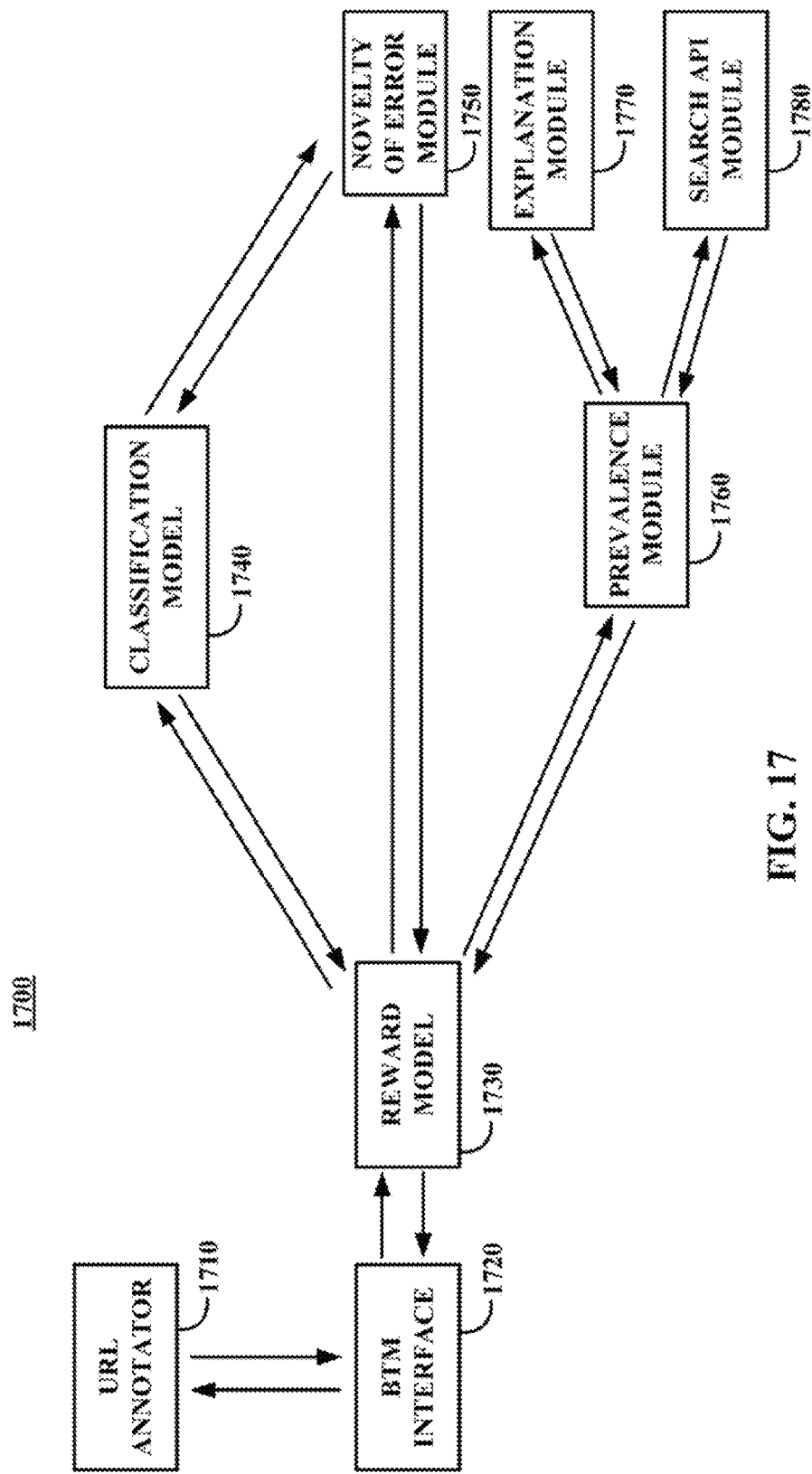
FIG. 17 is an illustrative transactional flow diagram for receiving an instance from an annotator user and evaluating the classification made by a predictive model in accordance with some embodiments of the disclosed subject matter.

In a more particular example, FIG. 17 shows an illustrative flow diagram for receiving an instance from an annotator user at an annotator computing device and evaluating the classification made by a predictive model using various models and modules in accordance with some embodiments of the disclosed subject matter. As shown in FIG. 17, the predictive model evaluation application can be distributed between an annotator user at computing device 1710, a BTM interface 1720, a reward model 1730, a classification model 1740, an error module 1750, a prevalence module 1760, an explanation module 1770, and a searching module 1780.

BTM interface 1720 can provide a data interface to an annotator user at computing device 1710 for submitting instances. For example, BTM interface 1720 can transmit a request to the annotator user at computing device 1710, such as "GetHumanLabelForURL (Category, URL)." In response, the annotator user at computing device can submit a category, a URL or any other suitable instance, and/or a classification. Upon receiving the category, the URL, and the classification from the annotator user, BTM interface 1720 determines the classification by the predictive model and determines a bonus payment or any suitable reward. For example, BTM interface 1720 can transmit a request, such as "GetEstimatedRewardForURL (Category, URL, Classification)" to reward model 1730.

Reward model 1730 can, in some embodiments, determine at least one of the classification by the predictive or classification model 1740, calculate a score associated with the surprise or novelty of the error made by the predictive model 1740 using error module 1750, and/or calculate a score associated with the prevalence of the error made by the predictive model 1740 using prevalence module 1760.

In some embodiments, reward model 1730 can transmit a request to predictive model 1740 that asks for the classification of the URL or any other suitable instance for the given category. In response, predictive model 1740 can transmit a classification for the particular instance and a confidence value that indicates the certainty or uncertainty for the classification of the particular instance. In a more particular example, the classification transmitted by the predictive model can be an indication of whether the instance belongs in a particular class or not (e.g., YES/NO). In another more particular example, the classification transmitted by the predictive model can be an indication of whether the instance (e.g., a medical document) is relevant to a particular informational need or class of information. Additionally, in some embodiments, in response to determining that the classification made by the predictive model 1740 and the classification submitted by the annotator user at computing device 1710 are different, predictive model 1740 can transmit an indication to error module 1750 of the disagreement between the annotator user and predictive model 1740. For example, predictive model 1740 can assert to error module 1750 that the classification submitted through BTM interface 1720 by the annotator user disagrees with the classification made by predictive model 1740.

In some embodiments, reward model 1730 can transmit a request to error module 1750 that asks whether the classification made by the annotator user is a surprise. In response to receiving the request, error module 1750 can determine whether it has received the indication from predictive model 1740 of the disagreement between the annotator user and predictive model 1740. If no such indication of the disagreement has been received, error module 1750 can respond that the error is a "known unknown" and not generate a surprise or novelty score. Alternatively, if an indication of the disagreement has been received from predictive model 1740, error module can calculate a surprise or novelty score (e.g., a number between 0 and 1) indicating whether the particular URL and classification is a surprise. For example, upon receiving a surprise or novelty score of 0, reward model 1730 can determine that the error is a known unknown. In another example, upon receiving a surprise or novelty score of greater than 0, reward model 1730 can determine that the error is an unknown unknown and determine a degree or magnitude of the error for calculating a bonus payment or a reward.

In some embodiments, predictive model 1740 can re-label the instance based on the disagreement, the surprise score, etc.

In some embodiments, reward model 1730 can transmit a request to prevalence module 1760 that asks how often the predictive model evaluation application can expect to see similar instances. In response to receiving the request, prevalence module 1760 can access an explanation module 1770 and/or a searching module 1780. Explanation module 1770 can return keywords and/or phrases that responsible for classifying the given URL into the incorrect class by predictive model 1740. For example, explanation module 1770 can review classification information and/or instance information associated with the classification and can determine particular keywords that triggered predictive model 1740 to make the particular classification. The keywords can be inputted into searching module 1780, which transmits a query to a search interface to determine the number of matching instances (e.g., other pages, documents, etc.) on the web. Searching module 1780 can be any suitable search interface, such as an application program interface to a search engine. In response, prevalence module can calculate a prevalence or frequency score (e.g., a number between 0 and 1) indicating the number of matching instances on the web.

Using the misclassification and the confidence score of the predictive model 1740, the surprise score from error module 1750, and/or the prevalence score from prevalence module 1760, the reward model 1730 can determine a bonus payment or any suitable reward (e.g., goods, services, discounts, points, etc.) for the instance submitted by the annotator user at computing device 1710. Additionally or alternatively, reward model 1730 can use the misclassification and the confidence score of the predictive model 1740, the surprise score from error module 1750, and/or the prevalence score from prevalence module 1760 to improve predictive model 1740. For example, reward model 1730 can incorporate the corresponding information as training data and update predictive model 1740 to account for the identified errors.

Referring back to FIG. 16, communications network 1606 can be any suitable computer network including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), or any combination of any of such networks. Communications links 1604 and 1608 can be any communications links suitable for communicating data between computing devices 1602 and server 1610, such as network links, dial-up links, wireless links, hard-wired links, any other suitable communications links, or a combination of such links. Computing devices 1602 enable a user to access features of the application. Computing devices 1602 can be personal computers, laptop computers, mainframe computers, dumb terminals, data displays, Internet browsers, personal digital assistants ("PDAs"), two-way pagers, wireless terminals, portable telephones, any other suitable access device, or any combination of such devices. Computing devices 1602 and server 1610 can be located at any suitable location. In one embodiment, computing devices 1602 and server 1610 can be located within an organization. Alternatively, computing devices 1602 and server 1610 can be distributed between multiple organizations.

More particularly, for example, each of the computing device 1602 and server 1610 can be any of a general purpose device such as a computer or a special purpose device such as a client, a server, etc. Any of these general or special purpose devices can include any suitable components such as a processor (which can be a microprocessor, digital signal processor, a controller, etc.), memory, communication interfaces, display controllers, input devices, etc. For example, computing device 1602 can be implemented as a personal computer, a tablet computing device, a personal data assistant (PDA), a portable email device, a multimedia terminal, a mobile telephone, a gaming device, a set-top box, a television, etc.

In some embodiments, any suitable computer readable media can be used for storing instructions for performing the processes described herein, can be used as a content distribution that stores content and a payload, etc. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Figure 18:
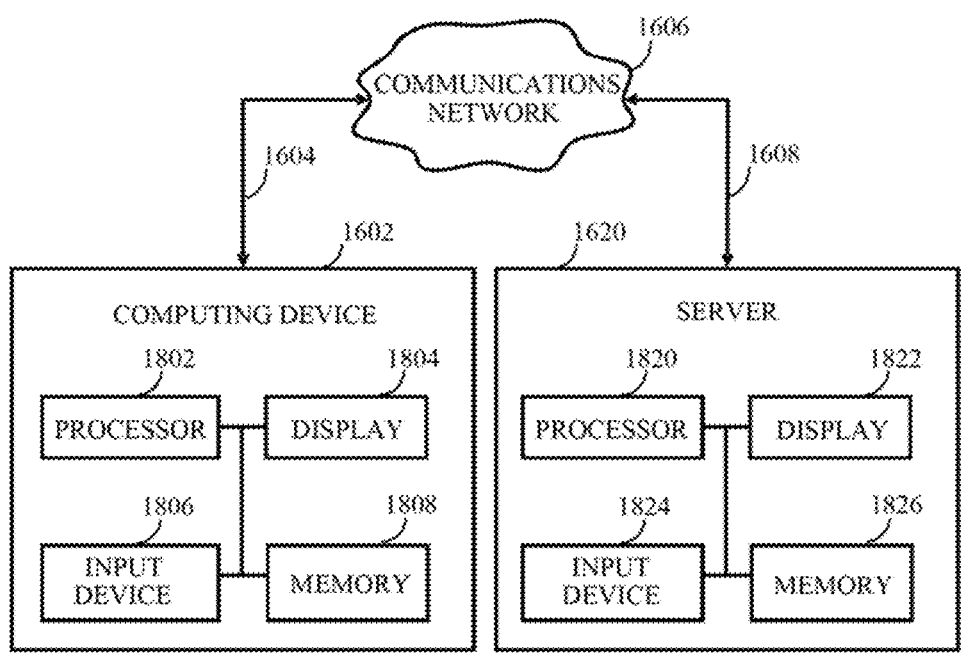
FIG. 18 is a diagram of an illustrative computing device and server as provided, for example, in FIG. 16 in accordance with some embodiments of the disclosed subject matter.

Referring back to FIG. 16, the server and one of the computing devices depicted in FIG. 16 are illustrated in more detail in FIG. 18. Referring to FIG. 18, computing device 1602 can include a processor 1802, a display 1804, an input device 1806, and memory 1808, which may be interconnected. In some embodiments, memory 1808 contains a storage device for storing a computer program for controlling processor 1802.

Processor 1802 uses the computer program to present on display 1804 the predictive model evaluation application and the data received through communications link 1604 and commands and values transmitted by a user of computing device 1602. It should also be noted that data received through communications link 1604 or any other communications links can be received from any suitable source. Input device 1806 can be a computer keyboard, a mouse, a cursor-controller, dial, switchbank, lever, or any other suitable input device as would be used by a designer of input systems or process control systems. Alternatively, input device 1806 can be a finger or stylus used on a touch screen display 604.

Server 1610 can include a processor 1820, a display 1822, an input device 1824, and memory 1826, which may be interconnected. In a preferred embodiment, memory 1826 contains a storage device for storing data received through communications link 1608 or through other links, and also receives commands and values transmitted by one or more users. The storage device further contains a server program for controlling processor 1820.

In some embodiments, the predictive model evaluation application can include an application program interface (not shown), or alternatively, the application can be resident in the memory of computing device 1602 or server 1610. In another suitable embodiment, the only distribution to computing device 1602 can be a graphical user interface ("GUI") which allows a user to interact with the application resident at, for example, server 1610.

In one particular embodiment, the predictive model evaluation application can include client-side software, hardware, or both. For example, the application can encompass one or more Web-pages or Web-page portions (e.g., via any suitable encoding, such as HyperText Markup Language ("HTML"), Dynamic HyperText Markup Language ("DHTML"), Extensible Markup Language ("XML"), JavaServer Pages ("JSP"), Active Server Pages ("ASP"), Cold Fusion, or any other suitable approaches).

Although the application is described herein as being implemented on a computing device and/or server, this is only illustrative. The application can be implemented on any suitable platform (e.g., a personal computer ("PC"), a mainframe computer, a dumb terminal, a data display, a two-way pager, a wireless terminal, a portable telephone, a portable computer, a palmtop computer, an H/PC, an automobile PC, a laptop computer, a cellular phone, a personal digital assistant ("PDA"), a combined cellular phone and PDA, etc.) to provide such features.

In most embodiments, the methods of the present application will be implemented on machines that are programmed according to the techniques described with respect to the embodiments for carrying out the functional features of the methods. Such machines include, but are not limited to, general purpose computers, special purpose computers, etc. For example, user computers and/or servers implemented in accordance with some embodiments can be a general purpose device, such as a personal computer, a laptop computer, a mainframe computer, a dumb terminal, a data display, an Internet browser, a personal digital assistant (PDA), a two-way pager, a wireless terminal, or a portable telephone, or a special purpose device, such as a server, a portable telephone, a multimedia device, etc. The server can be any suitable server for executing the application, such as a processor, a computer, a data processing device, or a combination of such devices. For example, the server can be a general purpose device, such as a computer, or a special purpose device, such as a client, a server, a multimedia server, etc. Any of these general purpose or special purpose devices can include any suitable components such as a processor (which can be a microprocessor, a digital signal processor, a controller, etc.), memory, communication interfaces, display controllers, input devices, etc. It should be noted that any reference to a general purpose computer are meant to be directed to a device programmed as described herein.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for identifying errors in predictive models using annotators are provided.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method for evaluating predictive models in classification systems, the method comprising:
   causing, using a hardware processor, an input region to be presented to a user, wherein the input region receives an instance from the user;
   in response to receiving the instance from the user, retrieving, using the hardware processor, a classification assigned by a predictive model for the received instance and a confidence value associated with the classification, wherein the classification has been stored in association with the instance from the user in response to determining that the classification exceeds a threshold value, and wherein the threshold value is set based at least in part on a penalty associated with misclassification of the instance;
   determining, using the hardware processor, whether the received instance has been incorrectly classified by the predictive model;
   in response to determining that the received instance has been incorrectly classified by the predictive model, (i) causing, using the hardware processor, the received instance and a corrected classification provided by the user to be used as training data to update the predictive model, and (ii) determining, using the hardware processor, a reward associated with the incorrect classification made by the predictive model, wherein the reward is directly proportional to the confidence value associated with the classification of the received instance;
   updating, using the hardware processor, the predictive model using the received instance as training data; and
   causing, using the hardware processor, an indication of the reward to be provided to the user.

2. The method of claim 1, wherein the instance includes at least one of:
   a page and a document.

3. The method of claim 1, wherein the input region includes task information relating to the predictive model, the method further comprising:
   receiving, from an administrator user, a selected predictive model from a plurality of predictive models; and
   determining the task information associated with the selected predictive model to display in the input region.

4. The method of claim 1, further comprising:
   receiving a user selection of the predictive model from a plurality of predictive models; and
   determining task information associated with the predictive model corresponding to the received user selection to display in the input region.

5. The method of claim 1, further comprising, in response to determining that the received instance has been incorrectly classified by the predictive model, transmitting the received instance to an administrator user for validation of the incorrect classification.

6. The method of claim 1, wherein determining whether the received instance has been incorrectly classified by the predictive model further comprises:
receiving an indication from the user that the received instance belongs in a minority class;
determining whether the received instance is classified by the predictive model as belonging in a majority class; and
transmitting the received instance to an administrator user for validation.

7. The method of claim 1, wherein determining whether the received instance has been incorrectly classified by the predictive model further comprises:
receiving an indication from the user that the received instance belongs in a majority class;
determining whether the instance is classified by the predictive model as belonging in a minority class; and
transmitting the instance to an administrator user for validation.

8. The method of claim 1, further comprising:
extracting a category identifier and a user classification from the received instance;
comparing the user classification with the classification made by the predictive model; and
inhibiting the received instances from being transmitted to an administrator user for validation based at least in part on the comparison and the confidence value.

9. The method of claim 8, wherein the received instance is rejected in response to determining that the user classification and the classification made by the predictive model are the same and the confidence value is greater than a second threshold value.

10. The method of claim 9, further comprising determining the reward in response to determining that the confidence value is below the second threshold value.

11. The method of claim 1, further comprising determining an error value associated with the classification based at least in part on the confidence value.

12. The method of claim 11, further comprising determining the reward based at least in part on the error value and the confidence value associated with the classification.

13. The method of claim 11, further comprising determining a frequency value associated with the classification based at least in part on keywords associated with the classification made by the predictive model.

14. The method of claim 13, further comprising:
determining the keywords associated with the classification made by the predictive model; and
transmitting a search query for instances matching the keywords associated with the classification made by the predictive model; and
calculating the frequency value based on the number of instances matching the keywords associated with the classification made by the predictive model.

15. The method of claim 13, further comprising determining the reward based at least in part on the frequency value and the confidence value associated with the classification.

16. The method of claim 13, further comprising determining the reward based least in part on the confidence value associated with the classification, the error value, and the frequency value.

17. The method of claim 1, further comprising retrieving a payment distribution associated with the predictive model that includes a first payment associated with a first confidence value and a second payment associated with a second confidence value, wherein the first confidence value is greater than the second confidence value and wherein the first payment is greater than the second payment based on the confidence value.

18. The method of claim 1, further comprising:
receiving a plurality of gaming parameters from an administrator user, wherein the input region that allows the user to submit one or more instances is presented based on the plurality of gaming parameters.

19. A system for evaluating predictive models in classification systems, the system comprising:
a processor that:
causes an input region to be presented to a user, wherein the input region receives an instance from the user;
in response to receiving the instance from the user, retrieves a classification assigned by a predictive model for the received instance and a confidence value associated with the classification, wherein the classification has been stored in association with the instance from the user in response to determining that the classification exceeds a threshold value, and wherein the threshold value is set based at least in part on a penalty associated with misclassification of the instance;
determines whether the received instance has been incorrectly classified by the predictive model;
in response to determining that the received instance has been incorrectly classified by the predictive model, (i) causing, using the hardware processor, the received instance and a corrected classification provided by the user to be used as training data to update the predictive model, and (ii) determines a reward associated with the incorrect classification made by the predictive model, wherein the reward is directly proportional to the confidence value associated with the classification of the received instance;
updating, using the hardware processor, the predictive model using the received instance as training data; and
causes an indication of the reward to be provided to the user.

20. A non-transitory computer-readable medium containing computer-executable instructions that, when executed by a processor, cause the process to perform a method for evaluating predictive models in classification systems, the method comprising:
causing an input region to be presented to a user, wherein the input region receives an instance from the user;
in response to receiving the instance from the user, retrieving a classification assigned by a predictive model for the received instance and a confidence value associated with the classification, wherein the classification has been stored in association with the instance from the user in response to determining that the classification exceeds a threshold value, and wherein the threshold value is set based at least in part on a penalty associated with misclassification of the instance;
determining whether the received instance has been incorrectly classified by the predictive model;
in response to determining that the received instance has been incorrectly classified by the predictive model, (i) causing, using the hardware processor, the received instance and a corrected classification provided by the user to be used as training data to update the predictive model, and (ii) determining a reward associated with the incorrect classification made by the predictive model, wherein the reward is directly proportional to the confidence value associated with the classification of the received instance;

updating, using the hardware processor, the predictive model using the received instance as training data; and causing an indication of the reward to be provided to the user.

* * * * *